US007539746B2

(12) United States Patent
Bankier et al.

(10) Patent No.: US 7,539,746 B2
(45) Date of Patent: May 26, 2009

(54) HIGHLY AVAILABLE TRANSACTION FAILURE DETECTION AND RECOVERY FOR ELECTRONIC COMMERCE TRANSACTIONS

(75) Inventors: John Bankier, Glasgow (GB); Ronald Brown, Fife (GB); John Cowan, Scotland (GB); Mohamed Dekhil, Sunnyvale, CA (US); Jerremy Holland, Los Altos Hills, CA (US); Phillip Love, Alhambra, CA (US); Stuart MacNeil, Edinburgh (GB); Eric McCall, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 1571 days.

(21) Appl. No.: 10/029,638

(22) Filed: Dec. 19, 2001

(65) Prior Publication Data
US 2002/0103663 A1    Aug. 1, 2002

Related U.S. Application Data

(60) Provisional application No. 60/266,134, filed on Feb. 1, 2001, provisional application No. 60/326,789, filed on Oct. 2, 2001.

(51) Int. Cl.
*G06F 15/173* (2006.01)
(52) U.S. Cl. .................. 709/224; 709/227; 709/203
(58) Field of Classification Search ................. 709/224, 709/227, 203
See application file for complete search history.

(56) References Cited

U.S. PATENT DOCUMENTS

| 5,287,501 | A | * | 2/1994 | Lomet | 707/202 |
| 5,774,660 | A | | 6/1998 | Brendel et al. | 395/200.31 |
| 5,958,064 | A | * | 9/1999 | Judd et al. | 714/4 |
| 5,991,750 | A | * | 11/1999 | Watson | 705/44 |
| 6,065,017 | A | * | 5/2000 | Barker | 707/202 |
| 6,108,700 | A | * | 8/2000 | Maccabee et al. | 709/224 |
| 6,108,701 | A | * | 8/2000 | Davies et al. | 709/224 |
| 6,138,159 | A | * | 10/2000 | Phaal | 709/226 |
| 6,292,905 | B1 | * | 9/2001 | Wallach et al. | 714/4 |

(Continued)

OTHER PUBLICATIONS

BEA Systems, Inc., "Achieving scalability and high availability for e-commerce and other web applications," Jun. 1999.

(Continued)

*Primary Examiner*—Kenny S Lin
*Assistant Examiner*—Lan-Dai T Truong
(74) *Attorney, Agent, or Firm*—Barry N. Young

(57) ABSTRACT

Electronic commerce transaction messages are processed over a network between a client and a server in a highly reliable fashion by establishing a secure or un-secure communications connection between the network client and the network server at an electronic transaction assurance (eTA) system, which is located in a communication path between the network client and the network server. The transaction type is identified in the message and the progress of the transaction is tracked using transaction models. Any failure in the back-end server system or in the network connections is detected and the failure is recovered from using an outcome determination technique. The failure of a node within the eTA system is masked from the network client by formulating an appropriate response and sending it back to the client such that the network client and network server that were using the selected node do not see any interruption in their communications.

51 Claims, 9 Drawing Sheets

U.S. PATENT DOCUMENTS

| | | | |
|---|---|---|---|
| 6,381,617 B1 * | 4/2002 | Frolund et al. | 707/202 |
| 6,832,207 B1 * | 12/2004 | Shkedi | 705/14 |
| 6,859,834 B1 * | 2/2005 | Arora et al. | 709/227 |
| 2001/0011235 A1 * | 8/2001 | Kim et al. | 705/26 |
| 2002/0070976 A1 * | 6/2002 | Tanner et al. | 345/810 |
| 2002/0073211 A1 * | 6/2002 | Lin et al. | 709/229 |
| 2002/0087912 A1 * | 7/2002 | Kashyap | 714/13 |
| 2002/0099632 A1 * | 7/2002 | Yanagidate et al. | 705/34 |
| 2002/0103712 A1 * | 8/2002 | Rollins et al. | 705/26 |

OTHER PUBLICATIONS

Cisco Systems, Inc., "Catalyst 6000 family accelerated server load balancing," (1999).

Harbaugh, L., "Get the low down: The inside facts on load-balancing routers and routing appliances," Apr. 24, 2002.

Intel Corporation, "Planning and building a data center: Meeting the e-business challenge," (2000).

* cited by examiner

HIGHLY AVAILABLE TRANSACTION FAILURE DETECTION AND RECOVERY FOR ELECTRONIC COMMERCE TRANSACTIONS

REFERENCE TO RELATED APPLICATIONS

This application claims priority of U.S. Provisional Patent Application Ser. No. 60/266,134 entitled "Highly Available Transaction Failure Detection And Recovery For Electronic Commerce Transactions" by Brown et al., filed Feb. 1, 2001, and U.S. Provisional Patent Application Ser. No. 60/326,789 entitled "Highly Available Transaction Failure Detection And Recovery For Electronic Commerce Transactions" by Bankier et al., filed Oct. 2, 2001. Priority of the filing dates of Feb. 1, 2001 and Oct. 2, 2001 is hereby claimed, and the disclosures of said Provisional Patent Applications are hereby incorporated by reference.

BACKGROUND OF THE INVENTION

1. Field of the Invention

This invention relates generally to computer network data traffic and, more particularly, to servicing and managing computer network transactions.

2. Description of the Related Art

Electronic commerce transactions are taking place over an increasing number of computer data networks, especially networks that communicate using the Internet protocol. Such transactions require highly reliable security to ensure proper completion of sale and purchase transactions, to ensure proper charges and credits, and to provide confidence to users that confidential information is not stolen or misdirected. In particular, the secure Internet communications standard that is in most widespread use is the Secure Sockets Layer (SSL), which is used for encryption and transfer of sensitive information. The sensitive information includes electronic transaction message data such as order information, payment and billing account information, shipping address, order history, and the like.

Most conventional Internet browsers, such as "Internet Explorer" by Microsoft Corporation and "Navigator" by Netscape Communications, Inc., support SSL encryption processing. Such communications are typically accomplished with the hypertext transfer protocol (HTTP), using such HTTP features as GET and POST messages to process communications between a customer at a network client node and an electronic transaction processor at a network server machine.

Because of the nature of the Internet, any message (such as an electronic transaction message) must pass through a great number of machines beginning with a client computer connected to the Internet before the message finds its way over the network and is received at the appropriate transaction server machine. To properly support such electronic transactions, suitable server systems for processing the transactions must provide reliable back-up operations in the event of failures in the SSL connections, or other HTTP communication failures. Most SSL connections are implemented through client computers that are hard-wired to a network connection, either through a local area network (LAN) connection or through a modem device. Such network connections are typically relatively stable on the client side connection, so that the SSL connection is usually maintained throughout the transaction process to completion.

The increasing use of wireless devices, such as mobile phones and personal digital assistant devices (PDAs), has made them suitable platforms to carry out electronic transactions as well. In this case, however, failures are more likely to occur on the client side, due to the nature of wireless communications, which are more susceptible to transmission errors, weak signals, and broken connections. This increased susceptibility to failure requires technologies that could sustain the state of the transaction and be able to continue that transaction once the customer re-establishes connection with the server.

Some state recovery techniques try to detect errors in POST message processing and then attempt to recover such message (transaction) processing by repeating the electronic transaction messages. For example, the "NetStructure 7180" product from Intel Corporation detects errors in responses to HTTP form POST operations and replays the form POST operation in turn to other Web servers until it receives a success response or until it has exhausted the list of known Web servers. This helps ensure that transactions are eventually completed, but this technique typically only handles transaction data submitted in the form of HTTP form POST operations and only recognizes synchronous error responses in the HTTP response. Systems that use this technique cannot handle transactions made up of multiple request or response messages and will not work properly in cases where POST is not implemented.

It should be apparent that there is a need for tracking of electronic commerce transactions comprised of both single and multiple messages and there is a need for detecting failures within those transactions. The present invention satisfies these needs.

SUMMARY OF THE INVENTION

In accordance with the invention, for a computer network in which client machines engage in electronic transaction messages with server machines, some classes of system failure are hidden from client side users and a recovery from the hidden failures is initiated. Additionally, any required responses to affected electronic transaction messages are regenerated. This is achieved through an electronic transaction assurance (eTA) system that provides reliability and assurance that electronic transactions will be completed, even if failures occur to the server machines or to the network carrying the electronic transaction messages between the client and the server machine. Thus, both failures and recovery from those failures may be transparent to client and server network nodes that are participating in electronic commerce transactions. In this way, the eTA system operates as a gateway between client and server nodes to ensure transaction completion and efficient failure tracking.

In one aspect of the invention, the eTA system communicates with a network client and network server using any standard communication protocol, such as the Secure Sockets Layer (SSL) of the Internet protocol.

Other features and advantages of the present invention should be apparent from the following description, which illustrates, by way of example, the principles of the invention.

BRIEF DESCRIPTION OF THE DRAWINGS

FIG. 8 also shows the flow of data through the eTA system in relation to electronic request messages and electronic response messages.

DETAILED DESCRIPTION

1. E-Commerce Transactions

Many commerce transactions are now conducted using computers and wireless devices connected together by means of electronics communications networks. The transactions involves customers at network client machines and providers at network server machines. These electronic commerce (e-commerce) transactions may be characterized as occurring in a variety of domains, two of which are the business-to-consumer (B2C) and business-to-business (B2B) domains.

Traditionally, much effort has been devoted to ensuring that electronic communication networks—such as those used in the Internet—can withstand failures of communications links and of communications routing and switching points. At least one problem that remains to be solved includes how to cope with the failure of all or part of the communicating computer systems within the organizations that are engaged in the e-commerce transactions.

1.1 eTA System

Figure 1:
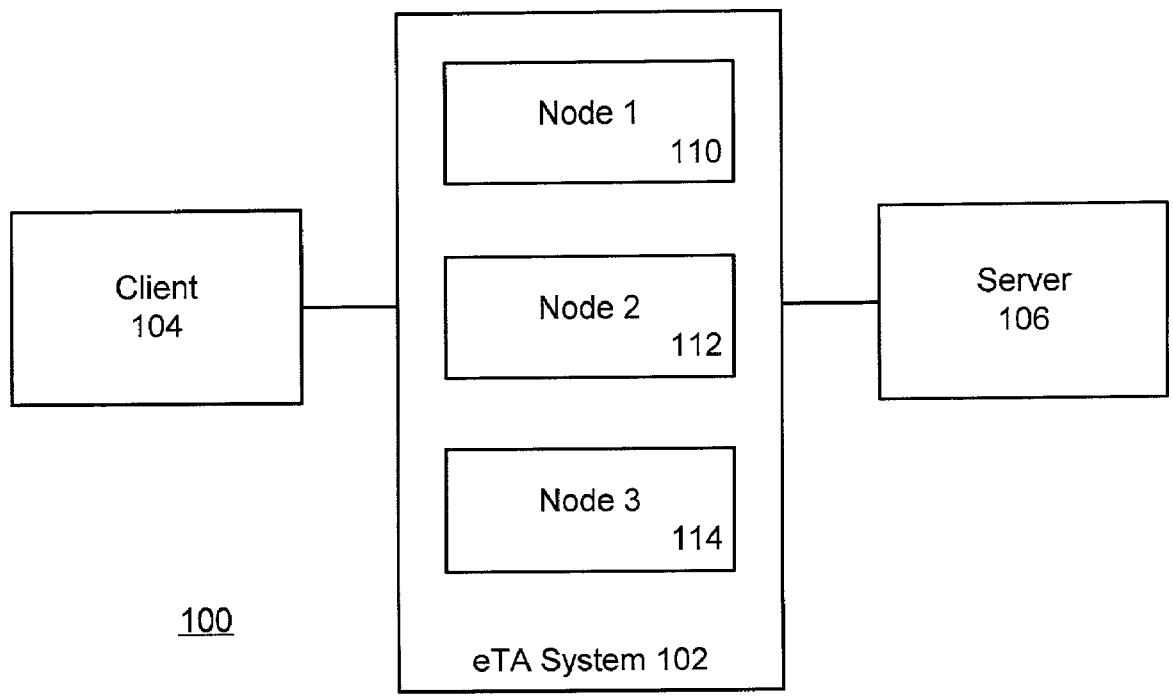
FIG. 1 is a schematic block diagram of a 3-node network electronic transaction assurance system constructed in accordance with the invention, shown connected to a computer network system including client and a network server.

FIG. 1 shows a network configuration 100 and illustrates the organization of an electronic transaction assurance (eTA) system 102 constructed in accordance with the invention. The eTA system 102 is configured to cope with failures that occur during transactions between a client and a server of a computer network system. FIG. 1 shows how the eTA system 102 is connected between one or more clients 104 and one or more Web servers 106, which may be linked by a computer network. The client 104 may comprise a computer that is operated by a user and linked to both the eTA system 102 and the server 106 through a computer network, such as the Internet. The server 106 may comprise a Web site server that is operated by a provider of goods or services. Communications between the client 104 and the server 106 may facilitate electronic commerce transactions between the two. The server 106 and the client 104 communicate by exchanging network messages that pass through the eTA system 102.

The eTA system 102 provides reliable operation and assurance of electronic transaction completion, in accordance with the invention. The eTA system 102 shown in FIG. 1 is composed of three eTA nodes 110, 112, 114. As described further below, each eTA node is an independent computer processor that is capable of handling transaction exchange messages that are sent from the client 104 to the server 106. If any one of the eTA nodes fails, the message traffic being handled by the failed eTA node is automatically transferred to one of the remaining active eTA nodes by the eTA system 102.

Having more than one eTA node in the eTA system 102 increases the reliability of the system by eliminating single points of failure. Thus, if one of the eTA computer nodes 110, 112, 114 fails, the eTA system 102 is still capable of processing electronic commerce transaction messages such that the failure will be transparent to any client machines 104 communicating with the associated provider servers 106. Although three eTA nodes 110, 112, 114 are illustrated in the eTA system 102, it should be understood that a different number of nodes may be incorporated into the eTA system 102, depending on the network configuration, server operation, and user needs. It also should be understood that the eTA system 102 may be placed anywhere in the network communication chain between the client 104 and the server 106. Thus, the eTA system 102 may act as an Internet gateway for an e-commerce Web site, where the eTA system 102 interfaces with the Internet.

Figure 2:
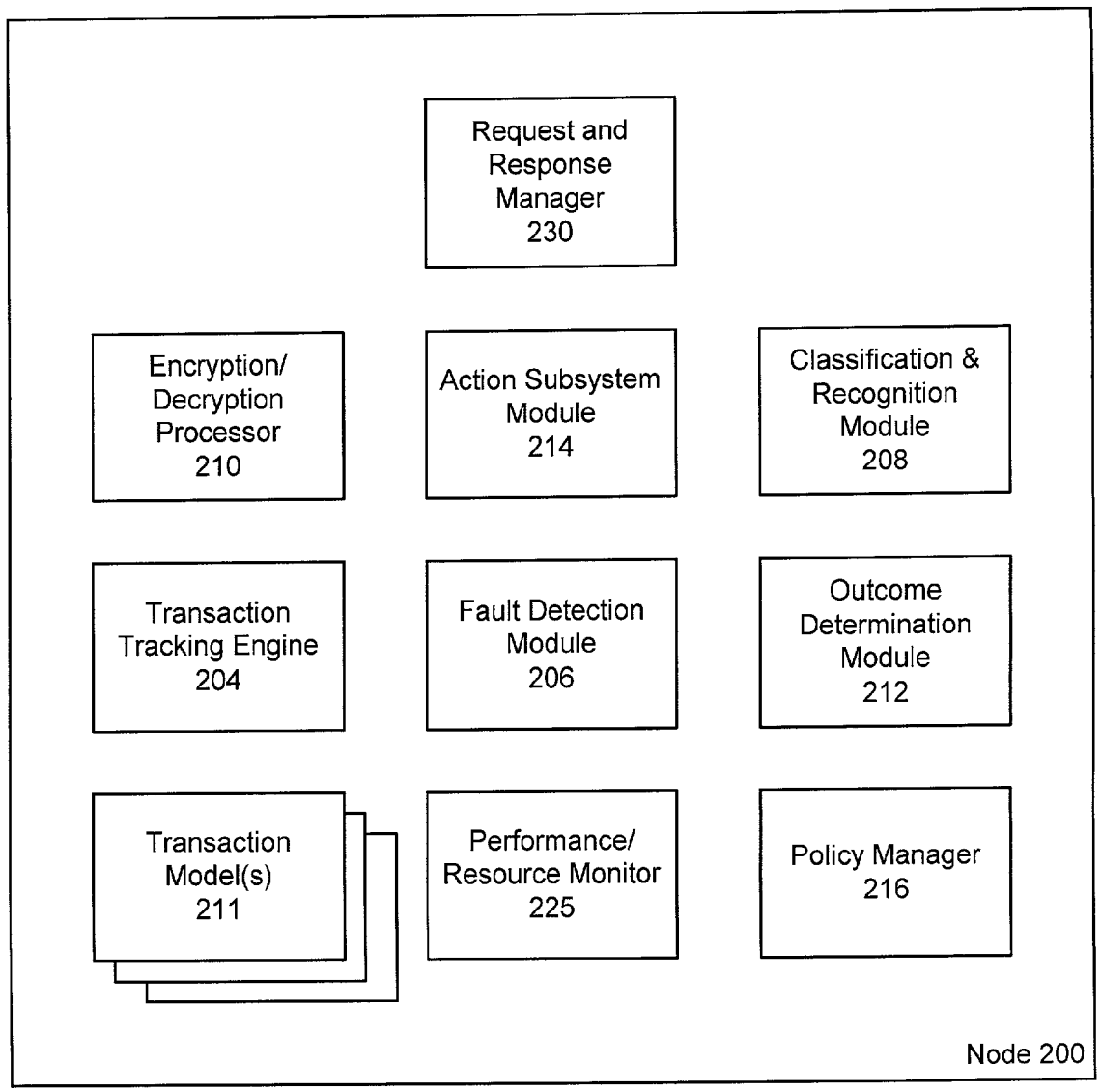
FIG. 2 is a schematic block diagram showing the construction of a single one of the nodes illustrated in FIG. 1.
Figure 3:
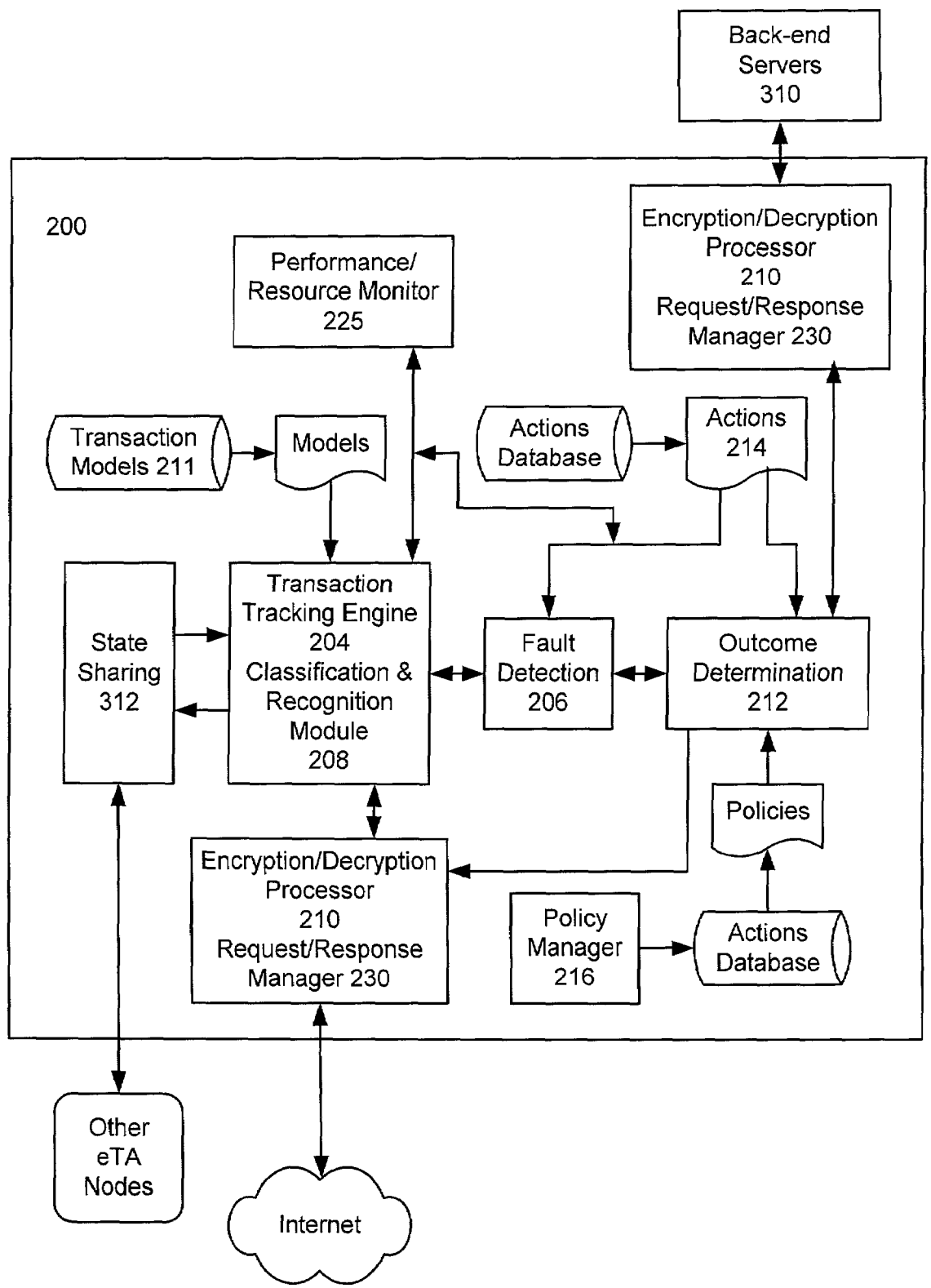
FIG. 3 is a schematic block diagram showing the arrangement of the components for the node illustrated in FIG. 2.

FIG. 2 shows the configuration of the eTA system on one exemplary node 200, which may comprise a conventional Internet protocol-enabled computer capable of network communications. FIG. 3, described further below, shows the relationship between the different components in the single eTA node illustrated in FIG. 2.

As shown in FIG. 2, an eTA node 200 of the preferred embodiment includes an SSL Termination Encryption/Decryption processor 210, which performs any needed decryption or encryption processing according to well-known methods. The Encryption/Decryption processor 210 communicates with a Request and Response Manager 230 to handle request messages that originate from the client 104 and response messages that originate from the server. A Performance/Resource Monitor 225 monitors and maintains statistics on system throughput and errors, as described in more detail below.

The node 200 also includes a Transaction Tracking Engine 204, which preserves state information concerning user sessions and electronic transactions that are the subject of electronic messages being processed by the node 200, as described in more detail below. The Transaction Tracking Engine 204 maintains one or more databases to store the state information, including a database for maintaining information regarding open sessions and transactions. The node 200 further includes a Fault Detection module 206 that is configured to recognize any fault conditions or other error-indicating message processing situations.

The eTA node 200 also includes a Classification and Recognition module 208 that processes received electronic messages and determines an electronic transaction classification of the message for further handling. The classification may include, for example, a purchase order, a request for information, an addition to an online shopping cart, and the like. The node 200 also includes one or more Transaction Models 211, with a different model for each vendor or transaction customer and optional custom or specially configured models for each vendor. As an example, a large on-line retail operation might include several transaction models to cover transactions that can include user authentication, submitting and modifying a purchase order, modifying delivery arrangements for a purchase, keeping and modifying an online shopping cart and/or user profile, requesting order modification, and so forth. Thus, a different transaction model would be provided for each of these transaction types.

The Transaction Model 211 defines the beginning of a transaction for the Transaction Tracking Engine 204 to start processing the client request and to extract the required information to identify and classify the transaction using the Classification and Recognition module 208. The Transaction Model 211 also defines the expected responses from the backend server, which enables the Failure Detection module 206 to detect any errors from the backend server by comparing the expected response message to an actual response message from the backend server. Once a failure is detected, an Outcome Determination module 212 uses the information in the Transaction Model 211 to determine the state of the transaction and trigger the appropriate recovery action from the Action Subsystem 214, as described bellow.

The Outcome Determination module 212 of the node 200 determines the actual state of the electronic transaction at the server 106 when a fault is detected, as well as particular outcomes that are expected for each type of transaction being handled by the node. For example, in a transaction where a user is adding an item to an electronic shopping cart, a fault can occur either before or after the transaction takes effect at the server 106. If the item was successfully added to the shopping cart before the fault occurred, then the transaction should not be resubmitted. However, if the server 106 did not successfully receive the transaction so that the item was not added to the shopping cart, then the transaction should be resubmitted to the server 106.

The Outcome Determination module 212 can use various approaches through which it may determine the state of the transaction. In one approach, the Outcome Determination module 212 specifies a certain Web page and a corresponding textual pattern to match in that page. For example, in the case of adding an item to an electronic shopping cart, the Outcome Determination module 212 can specify a Web page that contains updated shopping cart information, which indicates that the transaction successfully completed prior to the fault occurrence. In another approach, the Outcome Determination module 212 provides scripts that can be called to query the server 106 regarding the state of the transaction.

An Action Subsystem 214 of the node 200 determines the appropriate action that should be undertaken or implemented by the node 200 in response to any fault that may occur while processing the electronic transaction and in response to resource and performance states of the server 106. In this regard, the Action Subsystem 214 can maintain a list of faults and a corresponding list of one or more actions that are taken upon occurrence of each fault.

In addition, the eTA node 200 includes a Policy Manager 216, which enables creating and maintaining a set of policies and rules to specify the appropriate responses that the eTA system 102 sends to the customer (i.e., the client computer 104) when certain faults occur. The Policy Manager 216 preferably specifies business-level rules that govern the behavior of the node 200 in response to faults, the behavior being based on certain conditions and a corresponding set of actions. For example, one policy could specify that in the event of a backend database failure on the server 106, an electronic coupon is sent to eligible users that are affected by the failure and a different message is sent to all other users, asking them to return to the server 106 at a later time. Another policy could specify that a pager call is sent to the system administrator of the server 106 when a failure occurs.

FIG. 3 is a schematic diagram that shows the flow of processing operations within an exemplary eTA node 200 and indicates that each eTA node 200 communicates with back end servers 310 of the server 106, with client computers 104 through the Internet, and with other eTA nodes of the eTA system. The backend servers 310 include, or have access to, backend databases of the provider. The node 200 communicates with the Internet through an encryption/decryption module, which comprises the encryption/decryption processor 210 described above with respect to FIG. 2. The node 200 shares the states of transactions with other nodes through a state sharing block 312.

Figure 4:
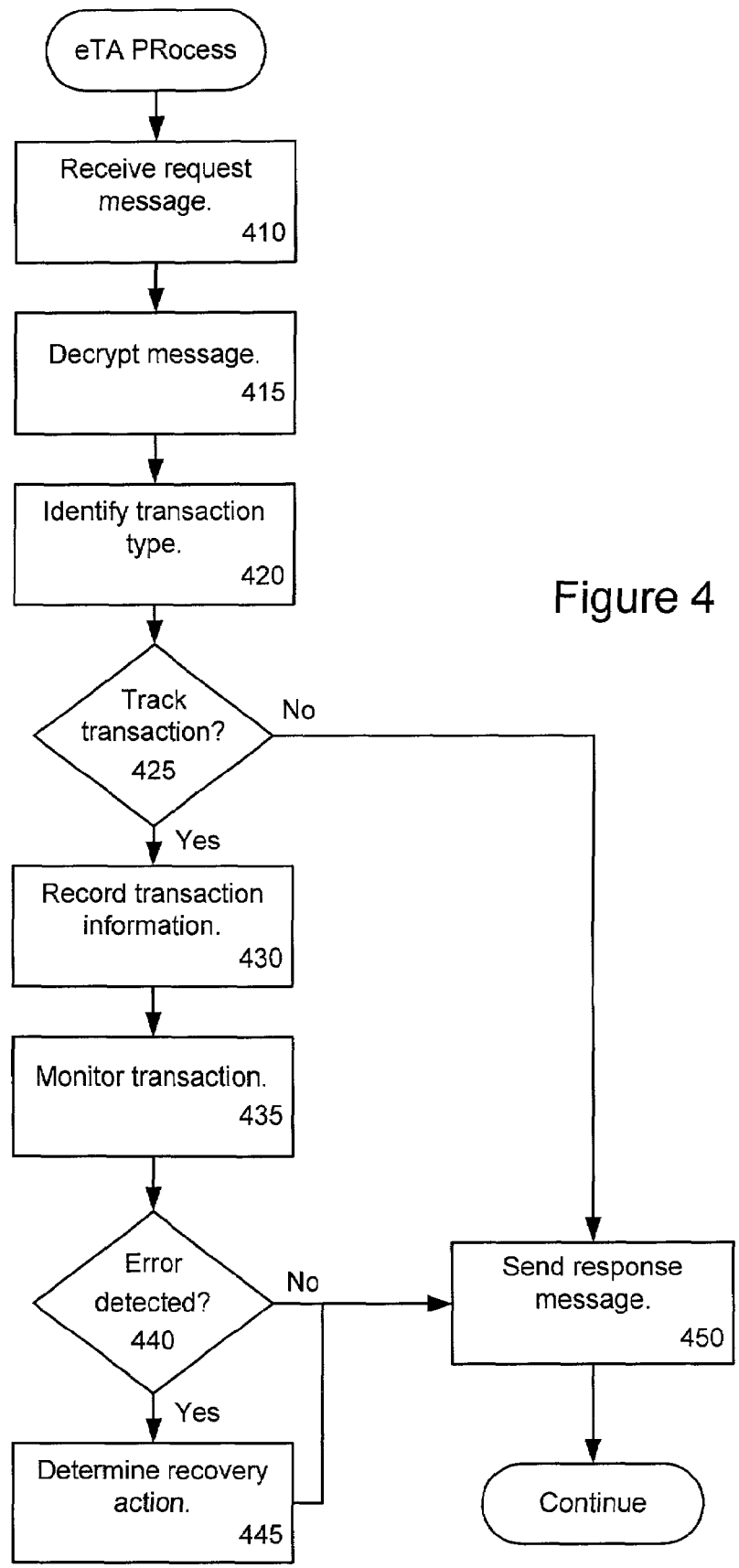
FIG. 4 is a flow diagram that illustrates the operation of the FIG. 2 node.

FIG. 4 shows a flow diagram of the overall process operations of an eTA node 200. The process starts when an e-commerce request message is received at the eTA node 200, as represented by the flow diagram box numbered 410. A typical electronic transaction process involves the exchange of one or more messages between a client machine and a server machine. For example, the transaction can include a message comprised of the user logging into an account or revising an electronic shopping cart, as described further below in section 1.3. The electronic message may conform to a wide variety of protocols, such as the hypertext transfer protocol (HTTP). Additionally, the electronic message may include a Web page comprised of a hypertext document written in the hypertext markup language (HTML).

If the message is encrypted, then the Encryption/Decryption processor 210 (e.g., an SSL termination component) processes the message to decrypt it to a clear, readable format that is acceptable to the Classification Recognition module 208 and the other eTA node components and modules. This is represented by the flow diagram box numbered 415. Once the message is readable by other eTA components, the Classification Recognition module 208 identifies the transaction type of the message, as represented by the flow diagram box numbered 420.

The next operation is represented by the decision box numbered 425, where it is determined whether to track the transaction, the determination being based on the type of transaction. The aforementioned business policies and rules are used to determine whether a transaction is to be tracked. For example, a policy may specify that all transactions for particular users are tracked, while only certain transactions are tracked for other users. Another policy may specify that only certain types of transactions are to be tracked. Any transaction for which failure detection and recovery in accordance with the invention are desired must be tracked.

If the transaction is to be tracked by the eTA system 102 (a "yes" outcome from the decision box numbered 425), then the process proceeds to the operation represented by the flow diagram box numbered 430, where the Transaction Tracking Engine 204 of the node 200 records certain information about the transaction. Various information can be recorded, such as message arrival time, transaction type, sender's Internet address, and the like. The information can include information that describes the transaction, such as product number, price, quantity of items being purchased, coupon numbers, special promotions, etc. This information is used for logging, reporting, outcome determination, and recovery actions when certain faults occur. As described further below, the transaction information is preferably stored in each of the eTA nodes in the eTA system 102 for later retrieval, if that should become necessary.

In the next operation, represented by the flow diagram box numbered 435, the eTA system 102 monitors the transaction. The monitoring mechanisms preferably include a combination of active monitors and passive monitors. Active monitors actively and continuously inspect various parts of the transaction to determine whether any faults are present. Passive monitors await certain error codes or timeout signals. For example, if a response from the server 106 should be received within a predetermined time period, then the node 200 deems that an error is present if the response is not received within the requisite time period. In accordance with the active monitoring of a transaction, the node 200 can use a key comprised of a unique transaction identifier to actively query the server 106 regarding the state of a transaction. Section 3.1.3, below, describes various ways of associating a key with a transaction.

The next operation is represented by the decision box numbered 440, where it is determined whether an error (i.e., a fault) was detected as a result of the previous monitors. An error can be detected in a variety of ways. In one embodiment, an error is detected based upon the presence of a code that is embedded in a message from the server 106. For example, the message may contain an HTTP failure response code, such as a code in the 400 range (client error) or 500 range (server error). The error message can also be embedded in HTML code contained in the message. In another embodiment, the eTA system 102 may detect an error based upon lack of response from the server 106 when a response is required or if a response is not received within a predetermined time span. This is discussed further below in section 3.1.2.

If a fault occurs, such as a back-end Web server not responding to messages or a network connection going down, then the Fault Detection module 206 of the eTA node 200 detects the fault and identifies its source, and the decision box numbered 440 outputs a "yes."

The process then proceeds to the operation represented by the flow diagram box numbered 445, where the Outcome Determination module 212 of the node 200 determines the correct recovery action and sends the appropriate response to the client 104 that initiated the transactions. A recovery action comprises an action by the eTA system 102 that masks the error occurrence to the user of the client 104 or otherwise deals with the error to minimize inconvenience to the user. The Outcome Determination module uses information provided by the aforementioned fault monitors, as well as information regarding the corresponding transactions, to determine the correct recovery action. The recovery actions may include, for example, resubmitting the customer request to the server 106, redirecting the customer to another server 106 that can handle the remainder of the transaction, or sending a coupon to the customer when a failure occurs.

The eTA system 102 then sends an electronic response to the server 106 or the client 104, as represented by the flow diagram box numbered 450. The response is indicative of the recovery action that was determined in the previous operation. For example, the response may comprise sending a Web page that contains a message indicating that a fault has occurred and that the fault cannot be overcome. The Web page may include a coupon that compensates the user of the client 104 for any inconvenience. If the fault was successfully overcome, then the response preferably comprises whatever response that would have been sent to the user had the fault not occurred. After the eTA system 102 has sent the response to the client 104, it continues with other operations.

1.2 High Availability of the eTA System Using VIPs

The nodes 110, 112, 114 in the eTA system 102 shown in FIG. 1 are made highly available by the use of Virtual IP addresses (VIPs). This technique, which is referred to as the Rainfinity technique, is described in multiple pending U.S. patent applications assigned to EMC Corporation of Hopkinton, Mass., the assignee of the present invention, including the U.S. patent application Ser. No. 09/547,533 entitled "Distributed Server Cluster for Controlling Network Traffic", filed Apr. 12, 2000, now U.S. Pat. No. 6,691,165 and the U.S. patent application Ser. No. 09/437,637 entitled "Distributed Traffic Controller for Network Data", filed Nov. 10, 1999, which are incorporated herein by reference. In this description, references to "Rainfinity" and associated products are to EMC Corporation, assignee of the invention described herein. Other techniques for providing high availability of nodes may be used without departing from the invention.

According to operations in accordance with the Rainfinity technique, a set of VIPs is allocated to an eTA system 102 comprised of multiple eTA nodes. Each one of the active eTA nodes in the eTA system is assigned to handle communications associated with one or more of the allocated VIPs. If one of the nodes in the eTA system fails or is switched off, the remaining active eTA nodes recognize that this is happening or has happened, and each VIP assigned to the failed node is reallocated to one of the remaining active eTA nodes. The VIPs are used in conjunction with distributed gateway for computer network data traffic. The gateway dynamically reconfigures traffic assignments among multiple machines for increased network availability. If one of the distributed gateway machines becomes unavailable, traffic assignments are moved among the multiple machines such that network availability is substantially unchanged. The machines of the distributed gateway form a cluster and communicate with each other such that automatic, dynamic traffic assignment reconfiguration occurs in response to machines being added and deleted from the cluster, with no loss in functionality for the gateway overall, in a process that is transparent to network users, thereby providing a distributed gateway functionality that is scalable.

The use of VIPs in this way allows the eTA system to make all VIP addresses always available so long as there is an active eTA node, which means that all current connections to the failed node will be transferred to the other "healthy" nodes, and the transactions associated with these connections will continue without interruption. The term "transparent failover" is used to describe this type of behavior, in which the fact that a failure occurs is completely hidden from the customer (client) machine.

1.3 Importance of Availability

A typical electronic commerce transaction involves the exchange of a number of messages between the organizations involved. For example, a B2C exchange involving a customer purchasing books at on online Web site might consist of any combination of the following interactions between the customer (through the client 104) and the retailer/provider (through the server 106):

(a) Login.

(b) Browse Web pages on the site.

(c) Add items to a shopping cart.

(d) Modify the user profile.

(e) Create an order.

(f) Modify an existing order.

The interactions are implemented through the exchange of one or more electronic messages between the client 104 and the server 106. It should be understood that these actions may not happen sequentially. For example, one possible sequence might be for users to add items to their shopping cart, and then login before finally creating an order. Another possible sequence might be to login first, and then add items to a shopping cart, and then create an order.

In a business-to-business ("B2B") exchange, a manufacturing organization might submit a purchase order request for components to a provider that is a supplier organization. The supplier organization typically replies with a confirmation message, followed by an invoice message. All these interactions are carried out automatically by the software e-business applications running on both sides of the customer-provider message exchange.

A failure may occur at any point in the message exchange between the two parties to a B2C or B2B transaction. The failure may take the form of one or more of the messages not being delivered or a failure notification being sent in place of the next expected message in a successful transaction sequence (some part of the processing of a message involved in the transaction has resulted in a failure that has been detected but not corrected).

Although each of the organizations involved in the above examples may logically appear to be a single entity, in practice each organization (apart from the customer in the B2C example) will most likely be comprised of a number of sub-systems, any one of which may fail independently at any point within the multiple entities or divisions, and the transaction message exchanges will likely involve multiple communicating parties.

2. Exemplary Problem Description

The operation and construction of the system described herein will be better understood with reference to the following problem description. One purpose of an e-commerce transaction assurance service, as implemented with the eTA system 102 described herein, is to provide the following functionality in the e-commerce infrastructure:

(a) Automatic detection of any failures that might occur during the processing of an e-commerce transaction. In the business-to-consumer ("B2C") space, a transaction may include actions such as "add to cart", "place order", "search for item" or "perform account transfer". In the B2B space, example transactions include "submit request for pricing" or "submit purchase order".

(b) Tracking and storing transaction state, which enables wireless connections to resume their operations when they reconnect after losing communication due to weak or lost signals.

(c) Automatic recovery from any such failures.

(d) Where automatic recovery is possible, hiding the fact from the end user or client that any failures have occurred.

(e) In cases where automatic recovery is not possible, providing informative responses to customers and having a dialog with them.

(f) Accurate reporting and logging capabilities for on-going and past transactions and faults.

From a business perspective, the first three features satisfy the short-term goal of actually ensuring that the transaction is successfully completed and all five features satisfy the longer-term goal of maintaining customer and client satisfaction by improving the overall e-commerce experience.

A typical e-commerce transaction might involve a user (customer) using the client 104 to place an order for books with a retailer (provider) at the retailer's online Web site located at the server 106. From the user's point of view, some of the steps involved in the transaction may include the following, which each include the exchange of one or more electronic messages between the user at the client 104 and the provider at the server 106:

(1) The user connects to the Web site and is automatically assigned a session or shopping cart ID.

(2) The user browses for books and clicks on the "add to cart" button.

(3) Once all of the books have been chosen, the user clicks on the "checkout" button.

(4) The user is asked to provide his or her user name and password if the user has not done so already (assuming the user has already registered with this site).

(5) The user is asked to confirm delivery and payment details.

(6) The user clicks on the "place order" button.

(7) A confirmation message to the user is generated, complete with order reference number.

It should be appreciated that any one of the aforementioned steps can be considered a transaction between the user's client device and a server device on a network. As far as the user is concerned, the above interactions have taken place with a single entity or system, which the user knows as "the Web site". In reality a number of systems, or tiers of systems, may be involved, such as the following:

(1) DNS round robin or a dedicated load balancer or gateway will have directed the user request to a particular server in a Web site server farm. The actual Web server assigned to the user may change dynamically during the course of the transaction.

(2) The Web server at some point may have communicated with a dedicated application server (or one or more of a number of application servers in an application server cluster) in order to perform the business logic.

(3) The application server may have queried a back end database server cluster for book and account/payment details and returned those to the Web server.

(4) The application server may then have initiated a database transaction with a back end database cluster, asked for payment confirmation from a third party payment server, and once the payment confirmation has been received, committed the database transaction and returned a confirmation to the Web server.

Figure 5:
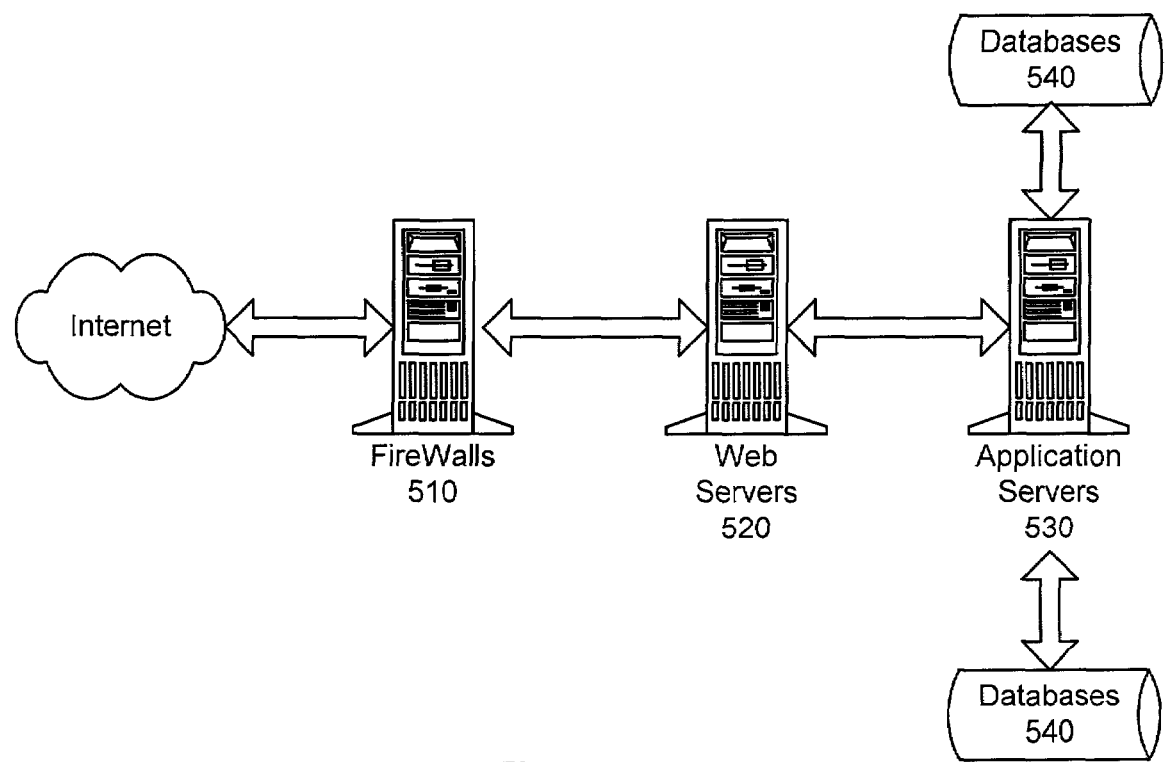
FIG. 5 is a schematic diagram that illustrates an exemplary electronic commerce system that includes the electronic transaction assurance system of FIG. 1.

FIG. 5 shows a typical example of an e-commerce system consisting of multiple sub-systems tiers including one or more firewalls 510, Web servers 520, application servers 530, and databases 540. It is desirable to eliminate the effect of failures that may occur at any of these sub-systems, and to hide this failure from the end customer, if possible, or provide sensible responses to customers when a timely recovery is not possible (e.g., the failure of a database may require twenty minutes to start a backup database as a replacement). In such a multi-tier system, the transaction assurance functionality, as implemented in the eTA system 102, preferably is able to cope with single or multiple system failures in one or more of the tiers. An eTA system 102 constructed in accordance with the invention may be located in the e-commerce system and may share functionality with one of the illustrated system components. Thus, the eTA nodes of the eTA system 102 may also provide firewall functionality, or Web server functionality, or may operate as application servers. Alternatively, the eTA system 102 may be placed as a separate entity at any location in the communications chain between the Internet and the database machines.

2.1 The Transaction Problem

Part of the problem to be solved in eliminating the effect of failures on electronic transactions is the lack of any transaction formalism in most of the existing e-commerce infrastructure and protocols. Initially, this means there are at least two major problems for resolution: (1) Protocols such as HTTP are inherently stateless and it is only by understanding at least some of the contents of the conversations that what constitutes the boundaries of a transaction can be determined; (2) Even where transaction boundaries can be recognized, there may not be sufficient support in the existing e-commerce infrastructure for all of the required functionality such as being able to rollback to the start state if it is spotted that a transaction has failed in mid-operation.

2.2 The State Problem

Although the protocols are stateless, each of the systems involved in the above example may be maintaining state information relating to a transaction. The state information may include the contents of the shopping cart, the identity of the user, selected payment method, and the current status of the transaction in the back end order-processing system.

If any of systems involved in the transaction fail, such as any of the systems illustrated in FIG. 5, it is highly desirable for the eTA system 102 to ensure that the necessary state information is recreated or otherwise made available to the replacement system, which is the server that handles transactions with the user in the event that the original server fails.

(a) Persistent State

If the state information is being maintained persistently in the back end servers in such a way that the replacement system may also have access to it—for example, if the information is being stored in a shared database—the eTA system 102 may simply ensure that the appropriate access key to enable access to that shared state is made available to the replacement system. The access key is made available to the Outcome Determination module 212 of a node 200 of the eTA system 102, which uses the key to determine the state of the transaction. The eTA system 102 then passes the key to the replacement system to continue the processing of the transaction. This may be a little or no cost operation if the key is based on a common parameter such as shopping cart ID. Various ways to associate a key with a transaction are discussed in more detail below in section 3.1.3.

(b) Transient State

Some or all of the systems may also be maintaining transient local state information, which may be maintained by the server 106, such as through backend Web servers or application servers. For example, the contents of the shopping cart may actually be being built up in local memory in the particular Web server or application server that is maintaining the shopping cart. It should be noted that Standard APIs, such as the Java servlet and the ASP/JSP APIs, make it relatively easy to create per-session in-memory objects. A description of state sharing and failover techniques is provided in U.S. patent applications Ser. No. 09/547,533 entitled "Distributed Server Cluster For Controlling Network Traffic", filed Apr. 12, 2000, now U.S. Pat. No. 6,691,165, and Ser. No. 09/566, 592, entitled "Distributed Server Cluster with Graphical User Interface," filed May 8, 2000, now U.S. Pat. No. 6,801,949, both of which are assigned to the assignee of the present invention.

If any of these systems involved in the transaction fail, it is desirable for the transaction assurance service to ensure that the transient local state information is shared or recreated on the system that takes over the responsibilities of the failed system.

3. Solution Strategies Overview

Figure 7:
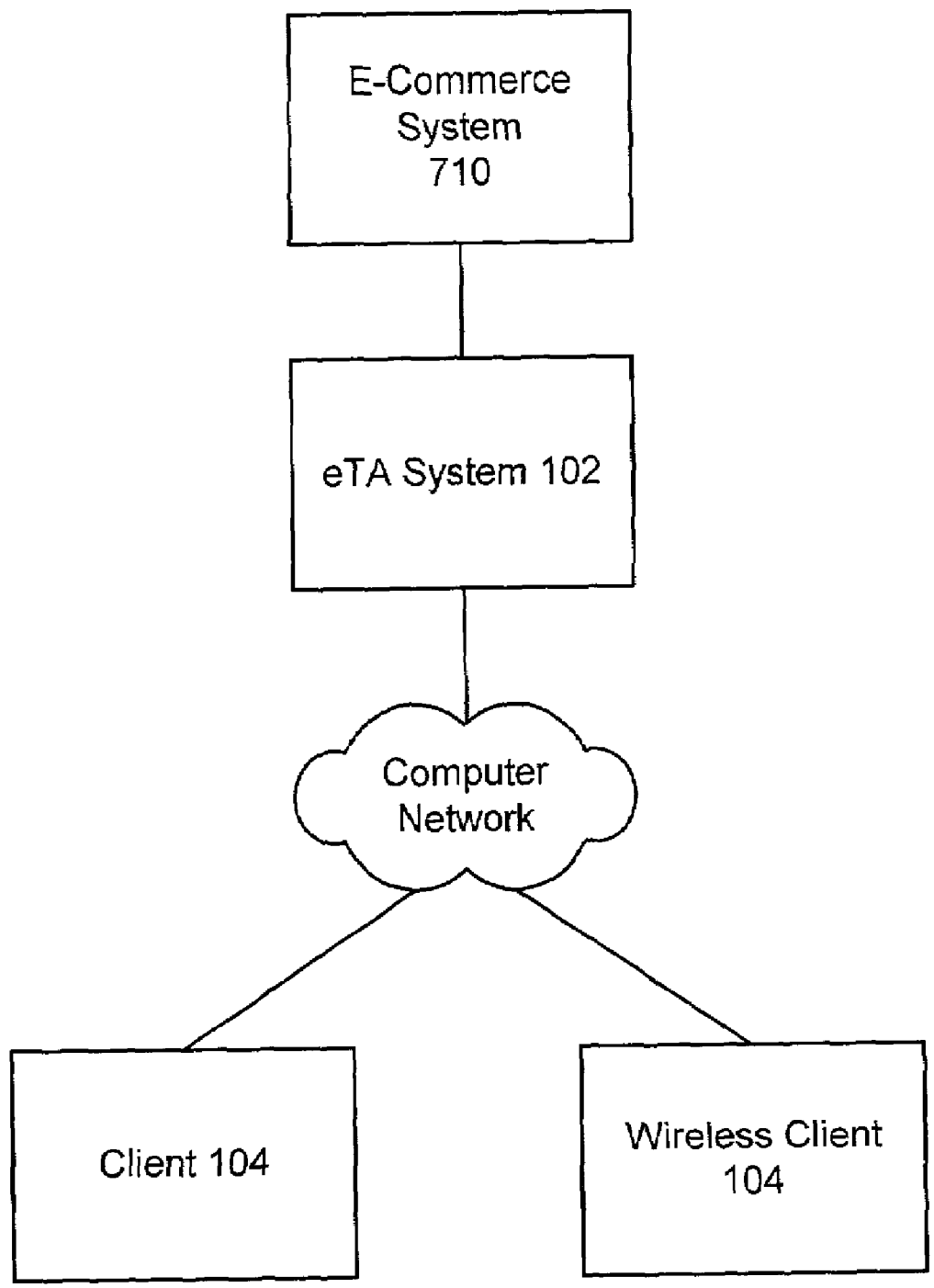
FIG. 7 is a schematic diagram that illustrates an exemplary deployment of the FIG. 1 system.

This section describes the major solution strategies and some of the options within those strategies to implement the transaction assurance provided by the eTA system 102 in accordance with the present invention. FIG. 7 shows a deployment scenario of the transaction assurance system in an organization with an e-commerce system 710 having an eTA system 102 of eTA nodes constructed in accordance with the invention. The e-commerce system 710 may comprise a multi-tier system such as that shown in FIG. 5. The e-commerce system 710 communicates with one or more clients 104, which can include both wired and wireless client machines, through a computer network such as the Internet.

The eTA system 102 can implement transaction assurance in a variety of manners, including four schemes that are described below. The preferred schemes of implementing transaction assurance include (1) conversation replay (described in section 3.1), wherein all network interactions that form a transaction are captured by the eTA system 102 and then replayed to a replacement back-end server in the event of a transaction failure; (2) state replication at the eTA system (described in section 3.2), wherein the eTA system 102 replicates the session and transaction states of a transaction in order to recover from a transaction failure; (3) state replication at the eTA system with tier assistance (described in section 3.3), wherein a backend system notifies the eTA system 102 when state information needs to be recreated in the event of a transaction failure; and (4) state replication at the system tier level (described in section 3.4), wherein transaction state is captured at tier levels of an e-commerce infrastructure.

Figure 6:
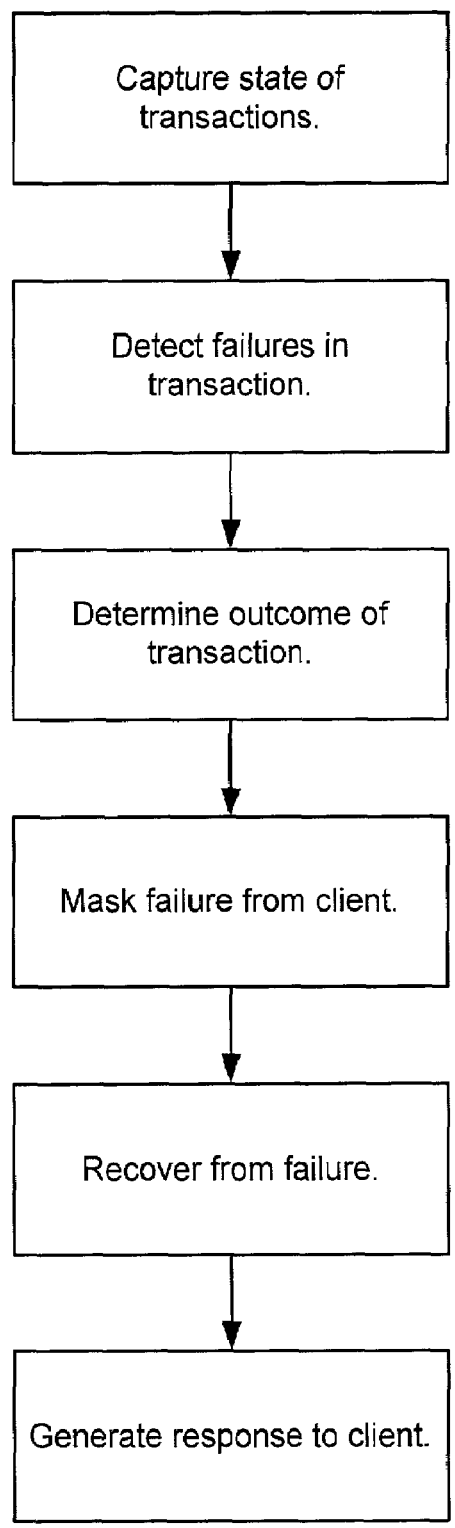
FIG. 6 is a flow diagram that shows a series of processes that are implemented by an eTA system in providing transaction assurance.

Each of these schemes for implementing transaction assurance preferably is configured to implement processes that satisfy certain functions, which are represented in the flow diagram of FIG. 6. The processes include (1) the ability to capture and share the state of a transaction; (2) the ability to detect a failure in a transaction; (3) the ability to determine the outcome of whether the transaction has succeeded or failed upon the occurrence of a failure at the server; (4) the ability to mask a failure from the client user so that the user is oblivious to the failure; (5) the ability to recover a transaction upon occurrence of a failure; and (6) the ability to generate a proper response in the event of a failure. The objectives are discussed below in connection with the different manners of implementing transaction assurance.

3.1 Conversation Replay

One reliable way of providing transaction assurance is for the eTA system 102 to capture all of the Web interaction that formed the basis of the transaction between the client 104 and server 106. In this way, the interaction can be replayed to another back end Web server in the event of a failure being detected by an eTA node 200 constructed in accordance with the present invention.

3.1.1 Transaction State Capture/Sharing

Transaction state capture and state sharing entails adding transaction assurance service functionality to the electronic transaction system to capture the actual conversation packets that were sent between the user's browser or client software and the back end server or provider software. The eTA system 102 preferably maintains a method of recognizing and storing all of the packets associated with a particular client session. For example, this may take the form of identifying the session and/or transaction ID in a cookie, hidden form fields, the requested URL or some other part of the protocol.

A number of eTA processing options are available to limit the amount of storage required for the packet capture and to compress the state that needs to be shared between nodes of the eTA system 102. In one embodiment, the eTA system 102 stores only significant requests between the client 104 and the server 106. For example, the eTA system 102 may only store HTTP form POSTs and GETs from a specified range of URLs associated with active shopping. A Transaction Capture module of the eTA node can decide which requests are stored. The data may be stored as part of the transaction models of the node. Alternately, standard protocol parameters within the packet header could be recognized and discarded or compressed. For example, this approach should work well for the standard HTTP header parameters.

In yet another embodiment, successfully completed transactions or parts of transactions that will persist in the back end e-commerce system could be recognized and the packets associated with them discarded immediately. For example, if adding details of a new credit card for payment is known to persist as soon as the change is made, the packets associated with that part of the session could be discarded. However, in order for the eTA system 102 to be able to recognize persistent transaction boundaries, this may entail assistance from the back end server. In the HTTP case, this assistance could take the form of the backend server placing tags in the response stream, so that the eTA system 102 could identify the tags in any electronic messages and thereby identify persistent transaction boundaries.

The resultant data can be stored in memory of the device that hosts the eTA system 102 or can be stored in a separate data store, depending on the amount of data and the performance constraints. Any eTA node 200 may also include a dedicated data store for storing data.

3.1.2 Failure Detection

The transaction assurance service, as implemented with the eTA system 102 described herein, is also responsible for detecting any failures in the electronic transaction system and determining the success or failure of a particular user or client request when a failure occurs. There are several ways in which a failure can be detected in accordance with the Conversation Replay transaction assurance scheme:

(1) Capturing return "codes"—for example, in the case of a Web transaction the back end server 106 may return an HTTP response code (standard or application specific) that corresponds to a predefined error code, or it may embed an error message in the HTML text of the response.

(2) Passive monitoring—if the eTA system 102 does not receive a response message from the server 106 for a specified period of time (a timeout period), then the eTA system 102 assumes that a failure has occurred at the server 106.

(3) Active monitoring—the eTA system 102 can include different types of software components that monitor the health of the system and the network to detect any failures in the electronic transaction system.

3.1.3. Outcome Determination

When the eTA system 102 detects an error in a transaction, the eTA system 102 attempts to discern the scope of the error by determining to what extent the transaction has been processed by the server 106. Upon detecting a failure at the back end provider server 106, the transaction assurance service, as implemented by the eTA system 102, proactively attempts to discover whether the transaction has succeeded or failed. The discovery utilizes an outcome query capability wherein the eTA system 102 queries the backend server to determine the state of captured packet stream. The eTA system 102 preferably extracts some information, such as a key comprised of a session or transaction identifier, from the captured packet stream in order to query the backend server and thereby make a determination about the state of the transaction.

To be able to determine the state of a transaction, the eTA system 102 uniquely identifies the transaction using the key, which is comprised of a unique transaction identifier. There are several ways to associate a key with each transaction, including:

(1) Some electronic transaction systems provide such key information that can be used to look up this transaction to determine if it is successfully persisted (stored) on the back end database at the server 106.

(2) Injecting a cookie in each response to the user, which will be sent back with messages from the client 104. The cookie contains key information that is used to uniquely identify a particular transaction.

(3) The eTA system 102 can add software components to the Web pages sent to the client 104, such as JavaScript code, Browser Helper Objects, or Browser Plug-in components, which would add the required key information with each request from the client.

The transaction identifier is preferably stored at the eTA system 102 and the server 106 at the completion of each transaction. The transaction identifier can be stored in a new database table, as a new field in an existing table, or encoded in an existing database field. In any of these cases, the electronic assurance system will be able to search for this key and determine the state of the corresponding transaction. This is important, to be able to correctly recover from failures and mask the failure from the client, as described in the next subsection.

3.1.4 Failure Masking

If the eTA system 102 detects a failure in the electronic transaction system, as discussed in the previous section, the eTA system 102 discards or stores a record of that error and attempts to recover over the error by invoking the transaction recovery functionality, which is described below. Preferably, the eTA system 102 sends an error response to the user (through the client 104) only if no recovery over the error is possible. In this way, any errors are masked from the user unless the error cannot be overcome.

Whenever the eTA system 102 detects a failed transaction, it preferably delays sending a failure response to the client 104 until after it has attempted any possible automatic recovery. If no recovery is possible, the eTA system 102 preferably gracefully informs the client 104 of the error, such as by sending a message informing that there is a temporary problem and that the user should come back later, and possibly offering an electronic discount or gift coupon.

If recovery is possible, the eTA system 102 preferably attempts to make the response received by the client 104 identical to what the client 104 would have received if the original request had succeeded. However, this may not always be possible. In some circumstances the client 104 may have to be redirected to a server 106 that shows reasonable context—for example, the contents of a shopping cart—and then use navigation buttons such as "continue shopping" to continue the session.

3.1.5 Transaction Recovery

Once an error has been detected, the eTA system 102 attempts to recreate sufficient state regarding the transaction on a replacement back end server in order to complete the failed transaction. In this solution, the eTA system 102 can replay the captured packet stream to the new back end server to thereby complete the transaction. In accordance with the invention, the eTA system 102 considers several factors in recovering a failed transaction, as described below:

(1) Creating a replacement connection to another back end server may entail creating a new set of session and/or transaction IDs by the eTA system 102. The eTA system 102 preferably dynamically translates between captured IDs and the new IDs when it replays the packets to the other back end server. The eTA system 102 also continues to perform this translation for any new requests that come in from the client 104 for which the error occurred.

(2) If some state is persistent across back end servers (such as the shopping cart contents), the eTA system 102 may perform a "rollback" to a known state before commencing the packet replay. For example, this may entail the eTA system 102 emptying an electronic shopping cart. However, if the user was relying on a shopping cart that is persistent between sessions, such a solution would be undesirable, as it would result in the loss of information.

(3) If any of the requests in the captured packet stream make use of volatile state in the back end server responses, the resubmitted request will fail unless the replacement system responds identically. An exemplary case is where the back end server returns a form containing a number of items as part of a search request. If the user then clicks on the "buy now" button and a request is sent back to the back end server containing the message "buy item 10", resubmitting that request will fail unless the item is still in the same position in the form that the new server returns. Depending on whether new items have been added or removed from the inventory, this may or may not be the case.

3.1.6 Response Regeneration

If the transaction has been recovered, then the eTA system 102 returns a response message to the client 104 that indicates that the transaction is successful from the new back end server. If the transaction cannot be recovered, then the eTA system 102 preferably returns a suitable error response to the client 104. The error response may take the form of the original or subsequent error responses from the back end servers. The error response may also comprise a Web page that offers an apology for the failure. Furthermore, the error response may include an electronic coupon that offers additional services or products as a compensation for the transaction failure.

3.2 State Replication at the eTA System

An alternative to the capture and replay of transaction conversation data outlined in the previous section is a solution based on the eTA system 102 explicitly replicating the session and transaction state that are necessary to recover from any failures. In order for the eTA system 102 to be able to recreate the state associated with a particular session or transaction in the case of a system failure, it is desirable for some component or components of the eTA system 102 to capture and make available the current state of each transaction and the session as a whole. For example, the eTA system 102 may maintain a record of the contents of a shopping cart and/or the current status of an order for a particular transaction.

3.2.1 Transaction State Capture/Sharing

For the implementation of the eTA system 102 in accordance with the invention, one alternative is to capture the transaction and session state in a gateway to the server 106. In order to be able to extract the state information, the eTA system 102 preferably understands at least some of the semantics of the messages flowing through it between the client 104 and the server 106. The eTA system 102 then stores relevant information about that conversation (the state) in some form.

The eTA system 102 may store the transaction state as an opaque type, where the details of the transaction semantics are not known. Rather, in an opaque type, the eTA system 102 may know some basic information regarding the transaction, such as the transaction name and the requested URL, but does not know information regarding next possible steps and error codes that may be returned. Alternately, the eTA system may attempt to model internal detail of a transaction state, which may require understanding even more of the conversation semantics. In a multi-tier system, communication between tiers downstream of the eTA system 102 will not be inherently visible. For example, although the gateway can capture state communicated between the end user/client 104 and the back end Web server 106, it cannot easily capture the state communicated between the tiers such as the back end Web server and application server or the application server and payment server.

3.2.2 Outcome Determination/Failure Detection

The Outcome Determination/Failure Detection techniques for State Replication are the same as the respective techniques for Conversation Replay (described above at Sections 3.1.2 and 3.1.3), wherein all of the Web interaction that formed the basis of the transaction is captured, so that the interaction can be replayed to another back end Web server in the event of a failure being detected.

3.2.3. Failure Masking

According to failure masking, the eTA system 102 captures all of the Web interaction information that formed the basis of an electronic transaction so that the interaction can be replayed to another back end Web server in the event of a failure being detected. The information is captured and stored at a database for retrieval.

3.2.4 Transaction Recovery

The Transaction Recovery technique is very similar the technique for that of the Conversation Replay scheme (described above at section 3.1.5) except that rather than attempting to recreate the state on the replacement system by replaying the captured packet stream, the eTA system 102 attempts to recreate the state using the captured version. The eTA system 102 could attempt to recreate the state by:

(1) Recreating a facsimile of the client interaction with the back end servers. This could either use the same interface—such as HTTP form posts—as a real user session or use a cut-down version specifically for recreating state.

(2) Use a private interface directly to the back end servers solely for the purpose of recreating state. However, not only would the back end servers have to implement this interface they would also have to understand the state as captured by the eTA system.

3.2.5 Response Regeneration

The Response Regeneration technique for the State Replication at eTA System scheme is the same as that for the Conversation Replay scheme (described above at section 3.1.6). The eTA system 102 captures all of the Web interaction that formed the basis of the transaction so that the interaction can be replayed to another back end Web server in the event of a failure being detected. Another alternative is to use the state information to construct the new response.

3.3 State Replication at the eTA System with Tier Assistance

This technique is a variation on the State Replication at the eTA System scheme without tier assistance (described above in section 3.2), where instead of the eTA system 102 being responsible for capturing state information, the back end servers 106 are responsible for notifying the eTA system 102 of state information that needs to be recreated in the event of a failover. Although this may require some modification to the back end server code, this modification could be limited to the code that causes the server to send out requests messages, such as "save state" and "restore state" messages, to the eTA system 102 when action is required.

3.3.1 Transaction State Capture/Sharing

Each of the relevant back end servers 106 of the provider informs an associated Internet Web site gateway, where the eTA system 102 is located, of significant new state and/or state changes. Such operation will be selected by the system designer, in accordance with the desired Web site transaction capability.

To communicate the state from the back end server 106 to the gateway eTA system 102, the state could be added to the normal server response flowing back to the client 104 and extracted by the gateway. This could be achieved by transferring the state information in a cookie or hidden form fields. The actual contents of the state could be opaque to the eTA system 102—this isolates the eTA solution from detail changes in state definition.

3.3.2 Outcome Determination/Failure Detection

The Outcome Determination/Failure Detection technique for the State Replication at eTA with Tier Assistance scheme is the same as that for Conversation Replay (described above in section 3.1.1), wherein all of the Web interaction that formed the basis of the transaction is captured so that the interaction can be replayed to another back end Web server in the event of a failure being detected.

3.3.3 Failure Masking

The Failure Masking technique is the same as that for the Conversation Replay scheme (described above in section 3.1.4), wherein all of the interaction between the client 104 and the server 106 that formed the basis of the transaction is captured so that the interaction can be replayed to another back end Web server in the event of a failure being detected.

3.3.4 Transaction Recovery

Each of the back end server tiers that are storing state in the eTA system 102 preferably also implement a "restore state" interface. In the case of system failure, the eTA system 102 attempts to recreate the state on a replacement system by calling the "restore state" interface with the last known state as notified by the failed system. However, a significant advantage in this implementation is that the details of the state can be managed solely by the back end server implementation. The eTA system 102 does not need to understand the state it is being asked to store, so that the actual contents of the state data are opaque to the eTA system. Only the back end server implementation needs to be modified if the details of the state change.

3.3.5 Response Regeneration

This technique is the same as that for response regeneration in the Conversation Replay scheme (discussed above in section 3.1.6), wherein all of the Web interaction that formed the basis of the transaction is captured so that the interaction can be replayed to another back end Web server in the event of a failure being detected.

3.4 State Replication at the System Tier Level

Another option that might be more suited to OEM solutions rather than a separate eTA system 102 external to a Web site is to capture and share the transaction state at each tier level in the e-commerce infrastructure. For example, Rainfinity eTA technology could be used by the server farms at each tier level to share local state information. As well as state sharing, the failover logic would also preferably be incorporated into the individual tiers or coordinated by some other component—possibly one of the higher level tiers or a gateway like an eTA system.

4. Elements of the System

The following sections provide a brief overview of elements of the eTA system 102 solution as described herein.

4.1 Transaction Modeling and Tracking

Each e-business solution defines a set of transactions, which represents the different business interactions with its customers. These transactions can be modeled as a set of finite state machines encapsulating the flow of messages between the parties involved in the transaction. One important part of the solution is to construct the transaction model for the e-business site and determine its parameters. One approach to doing this is using parameterized templates that represent typical transactions for a particular business area (e.g., banking, retail, auctions, etc.). Another approach is to use machine learning techniques to learn the different transactions and its relationships, as described in the following section. These models can be also used to track and recognize suspicious behavior and fraudulent activities. Furthermore, specialized modules for detecting certain behaviors can be driven by these models. The following are some examples of scenarios that the Transaction models can be configured to track and recognize:

Unexpected URL name in the request message.
Unusual request message size.
High number of failed login attempts.
Same user logging in too many time simultaneously.
Unusual value for items (e.g., stock price set too high, or too low).
Unusual quantities in shopping cart (e.g., 200 digital cameras).
Too many incomplete transactions in the same session.

These and other scenarios are indicative of suspicious behavior that could indicate tampering with the site security or trying to negatively affect its performance and availability. In addition, these models can be also used to generate records for billing purposes, particularly in a pay-per-use model of payment, where each type of transaction may have a certain price. The eTA system 102 can keep track of how many times activity for a certain transaction model is encountered and thereby determine or tabulate the expected billing charges based on the number of times that an actual transaction defined in a transaction model is encountered.

4.2 Model Construction Using Supervised Machine Learning

The purpose of constructing a transaction model is to create a system in which it is reliably possible to track the progress of transactions. This allows the eTA solution to determine the state of the transaction and to decide on the correct actions should any failure occur. The transaction model can be different from application to application and from e-business site to e-business site. To provide a generic solution to the problem and simplify the deployment process, there is desirably a way to automatically construct the transaction model for the target e-business. This can be accomplished by using supervised machine learning techniques, where an end user can "train" the eTA system 102 to recognize the significant transactions. Details of such machine learning techniques will be known to those of skill in the art, such as provided by neural network techniques.

For example, the user can tell the eTA system 102 to start recognizing an "add item" transaction. The user then walks the eTA system 102 through the steps of adding an item by clicking on the corresponding links and typing the required fields such as item name, quantity, etc. The eTA system 102 collects this information and stores it into a transaction recognition database for later classification. This preferably entails going over the same scenario multiple times for the eTA system 102 to uniquely identify a particular transaction. The eTA system 102 identifies the textual patterns in transactions that would enable the system to accurately classify and recognize different types of transactions. Using this approach enables the eTA system 102 to be deployed in different environments and reduces configuration efforts.

4.3 Failure Detection

A first feature of the solution is the ability to detect that a failure has occurred in the processing of a request. This may take a number of forms, including:

(1) Detecting one or more failure responses.
(2) Detecting the absence of one or more success responses.
(3) Actively tracking the processing of the request.
(4) Monitoring hardware involved in the transaction processing (both active and passive monitoring).
(5) Monitoring software involved in the transaction processing (both active and passive monitoring).

4.4 Failure Masking

One of the important objectives of the solution described herein is to hide or mask the fact that any failure has occurred from the customer. Preferably, the customer is notified of an error only when no failure recovery is possible. This is accomplished by intercepting all responses to the customer's client machine and filtering messages indicating failures.

Also, time-based responses could be used when a response from the site is not generated within a pre-defined time period.

4.5 Outcome Determination

The eTA system solution is able to determine at what point processing of the request failed. This is important so that the failure recovery part of the solution doesn't duplicate unnecessary processing of the original request. This is accomplished using the state information gathered by the transaction tracker. For example, an entire order should not be resubmitted merely because an acknowledgement wasn't sent. Different approaches to perform outcome determination were described above in Section 3.1.3.

4.6 Failure Recovery

The eTA system 102 is able to recover from any failure without causing any undesirable side effects. For example, without duplicating an order where the server 106 failed during the transaction. It may achieve this by either using in-built knowledge of the transaction processing to continue processing from the point of failure or by using a rollback mechanism to reset the system to a known state before replaying the entire transaction request.

Some of the possible ways to recover from failures include:
(1) Resubmit the failed request (full or partial).
(2) Redirect to other site (global redirection).
(3) Interactive response to customer (engaging the customer in a dialogue).
(4) Send incentive to customers to come back when system recovers.
(5) Informative messages to the customer.

4.7 Response Regeneration

The second part of the solution is that after failure recovery it should be able to regenerate the success response that the requesting entity was originally expecting to see. In this way the failure is completely hidden from the requesting entity.

4.8 Customer Experience Management

In one aspect of the invention, an electronic transaction assurance cluster system comprised of the eTA system 102 includes a policy-based engine for managing the customer experience, which comprises the message processing that is experienced by client and server machines outside of the eTA system 102. The cluster processing allows users of the system to define policies that include conditions (e.g., time-out values for receiving responses) and actions to be taken when any of the specified policy conditions is true. For example, a policy could specify that if a response is not generated in less than 5 seconds, the request will be redirected to an alternate site with a lower load.

Some of the actions that can be taken to manage the user experience may include:
(1) Resubmitting the transaction to another server in the site.
(2) Redirecting the request to alternate site.
(3) Engaging the customer in a "friendly" dialogue.
(4) Informing the customer of the situation and providing incentives to come back (e.g. a coupon).

One important goal is to enable a provider, such as a retailer, to provide the best possible transaction experience to a customer.

4.9 Logging and Reporting

The eTA system 102 described herein has the ability to record and report relevant information and statistics regarding the transaction state and system conditions. This can be done in real-time for current transactions as well as for past (historic) transactions. This information may include number of transactions within a certain period (succeeded, failed, recovered), response time statistics for each type of transaction, number of clients and their class of service (gold, silver, bronze, etc.), value of transactions within a certain period of time, and many more.

One approach to calculate the end-to-end response time of electronic transactions (from the client 104 to the eTA system 102 to the back-end server 106 and back) is to insert some code with each Web page served to the client, which would record the time a request from the client is sent and when the response to that request is received (at the client node). This would provide the total time a transaction took. By recording the time at the eTA system 102 and recording when the transaction message is sent to the back end system, the eTA system 102 can calculate the time spent at each part of the system and can provide this information in a report, such as in a transaction log. Logging is also important for analyzing and debugging the behavior of the eTA system 102 and the electronic transaction system as well.

5.0 Data Flow Through the eTA System

Figure 8:
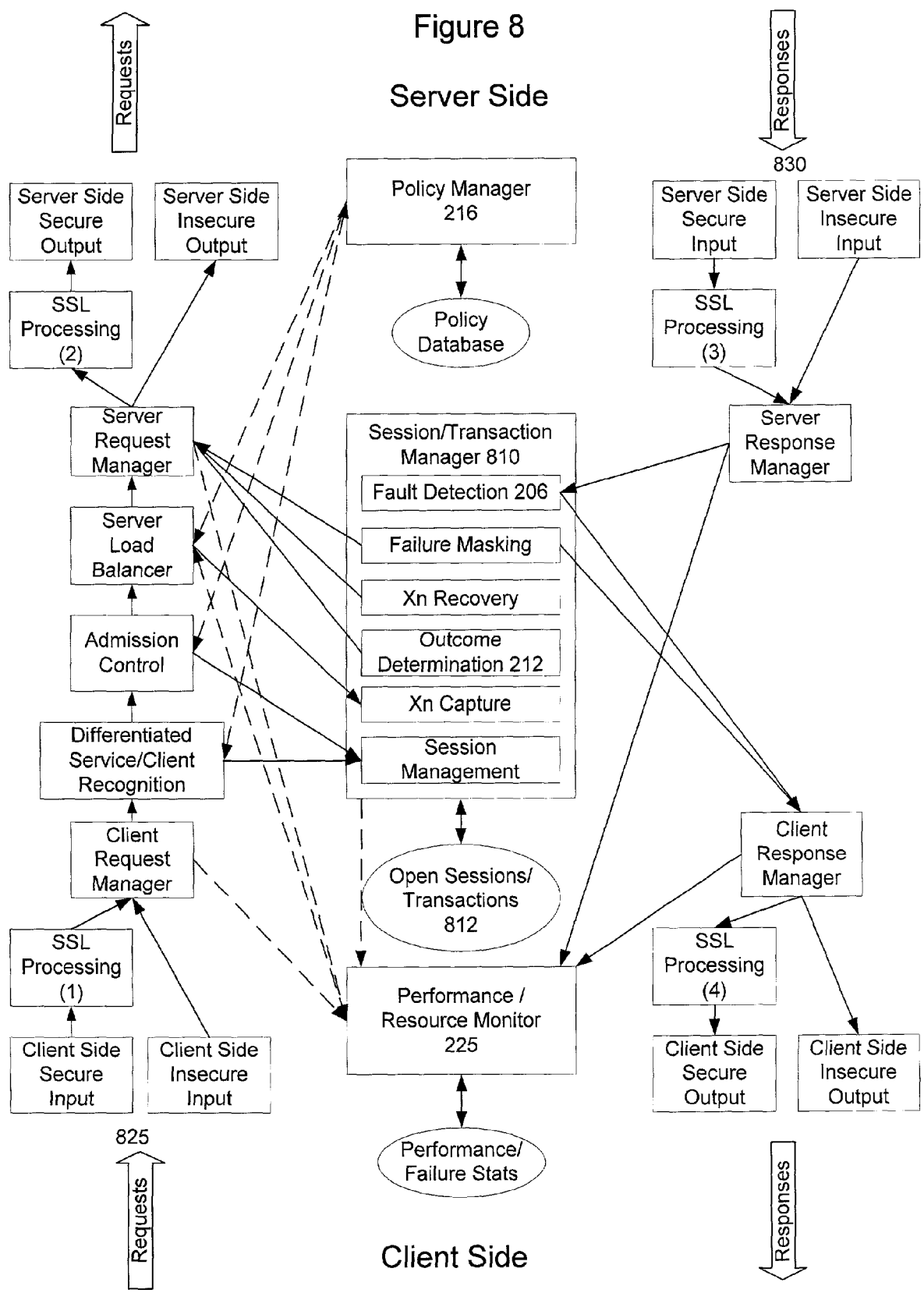
FIG. 8 is a block diagram of the various components of a node of the eTA system 102.

FIG. 8 shows a block diagram of the various components of a node of the eTA system 102. FIG. 8 also shows the flow of data through the eTA system 102 in relation to electronic request messages from the client 104 to the server 106 and electronic response messages from the server 106 to the client 104. More particularly, the left side of FIG. 8 shows the data flow for client request messages and the right side of FIG. 8 shows the data flow for server response messages.

As described above with respect to FIG. 2, the Policy Manager 216 controls access to the policy settings that govern the response of the eTA system 102 to request and response messages. Various eTA components (including the Differentiated Service/Client Recognition, Admission Control, and Server Load Balancer shown in FIG. 8) use the policy settings to manage the user experience of the Web site located at the server 106.

The eTA system 102 includes a Session/Transaction Manager 810 that manages components that enable the various functions of the transaction assurance schemes discussed above. The Sessions/Transaction Manager is part of the Transaction Tracking Engine 204 shown in FIG. 2. The components managed by the Sessions/Transaction Manager include transaction capture, failure detection, outcome determination, failure masking, and transaction recovery/response generation components. The Session/Transaction Manager 810 also includes a session management component that keeps track of sessions between the client 104 and the server 106. The session management component is part of the transaction tracking engine 204 shown in FIG. 2.

The Session/Transaction Manager 810 maintains a data repository 812 of open sessions and transactions. The Manager 810 records the current state of each session in enough detail to recreate the session state on a backup replacement server using standard requests that can be understood by the replacement system, such as an "add item to shopping cart" request. The open transactions are represented as state machines that are updated as requests and responses are processed.

The eTA system 102 further includes the Performance/Resource Monitor 225, which monitors and maintains statistics on system throughput and errors that are used to shape the response of the system. The Performance/Resource Monitor 225 keeps track of the load of requests on the server 106 and determines whether new requests should be transferred to a replacement server if the load is too heavy. For example, if an Admission Control component of the eTA system 102 detects that the overall load is in danger of causing the server 106 to fail, the client 104 may be redirected to another site or an appropriate message may be sent to the client 104.

The Performance/Resource Monitor 225 preferably maintains statistics relating to client interactions with the server 106, including statistics relating to SSL connections. Such SSL statistics include, for example, the number of SSL connection attempts and number of successful and unsuccessful SSL connection attempts.

5.1 Request Message Data Flow and Processing

The request messages from the client 104 can be viewed as part of a continuous stream of packets. The eTA system 102 preferably reassembles the stream into discrete requests for processing by the subsequent components in the request path of the eTA system. As mentioned, the request path is illustrated along the left side of FIG. 8. The eTA system 102 receives a stream of request messages at an input 825, which is shown at the lower left corner of FIG. 8. The eTA system 102 routes the stream to either a Client Side Secure Input component or Client Side Insecure Input component, depending on whether the request stream is encrypted or not. The Insecure/Secure Input and Output components shown in FIG. 8 are part of the Encryption/Decryption Processor 210 of FIG. 2. These components handle encrypted request and response messages.

If the stream is encrypted, then the eTA system 102 next routes the stream to an SSL Processing component for decryption and then to a Client Request Manager component, which is part of the Encryption/Decryption Processor 210 shown in FIG. 2. Otherwise, the request is routed directly to the Client Request Manager component, which is responsible for taking the unencrypted stream and segmenting it into discrete requests that can be handled by the eTA system 102. The Client Request Manager is responsible for ensuring that all parts of the request, including cookies, are passed as a single request entity to subsequent components of the eTA system 102.

The eTA system 102 then passes the discrete client request to a Differentiated Service/Client Recognition component, which attempts to identify a client session to which the request belongs. The Differentiated Service/Client Recognition component is part of the Classification & Recognition Module 208 (shown in FIG. 2). The Differentiated Service/Client Recognition component communicates with the Session Management component of the Session/Transaction Manager 810, which consults the data repository 812 of the Open Sessions/Transactions database to identify the current session, such as using a session ID number that is contained in the stream. The Session Management component of the Session Manager 810 creates a new session if necessary, such as where the server 106 has previously failed and the session has to be reestablished. In such a case, the Session Management component will perform a session ID translation, as described further below. The Session Management component then returns the session information to the Differentiated Service/Client Recognition component.

If the Differentiated Service/Client Recognition component detects that a new session has been created by the Session Management component, it then attempts to identify what level of service the client or user associated with that session is entitled, preferably by communicating with the Policy Manager 216. The Policy Manager 216 consults the policy database to identify the appropriate level of service for the session. The level of service may include traffic thresholds of the server 106 for which service to the client 104 is guaranteed. The level of service is then associated with the session, so that when subsequent requests for that session are received the service level will be available as soon as the session has been identified. The level of service entitlement will also determine whether a session is eligible for subsequent transaction assurance processing.

The request and associated session information (including service level entitlement) are then passed to an Admission Control component, which is part of the Action Subsystem module 214 shown in FIG. 2. The Admission Control component communicates with the Performance/Resource Monitor 225, which examines the current performance and resources of the server 106 and provides relevant data. Using the configured traffic threshold levels from the Policy Manager, the Admission Control component decides whether to continue processing the request message or to instead send a redirect/apology/coupon to the client 104 using the Client Response Manager, as described more fully below. The Admission Control component informs the Session Management component if a request or session has been denied so that the data repository 812 can be updated. The Admission Control component can also be used to limit request messages from the client 104 to one or more uniform resource locators (URL).

If the Admission Control component allows the request message, then the message is passed along with associated session information to a Server Load Balancer component, which is managed by the Action Subsystems module 214. This component uses the request and session information along with information from the Performance/Resource Monitor 225 and Policy Manager 216 to determine the target server to which the request message is routed. Preferably, the Server Load Balancer only performs this task when it detects that a new session has been created. It then associates the target server with the session so that subsequent requests for that session get routed to the same server. However, per request load balancing can also be implemented.

The Server Load Balancer also informs the Transaction (Xn) Capture component of the Session/Transaction Manager 810 that this request has been passed for processing to a particular server. The Session/Transaction Manager 810 then updates the data in the data repository 812 accordingly.

The Server Request Manager then routes the request message either directly to a Server Side Insecure Output component or to a Server Side Secure Output Component (via a an SSL Processing component). Some configurations may require secure communication of the request message to the server 106 infrastructure. In this case, the eTA system 102 uses the SSL Processing component to perform an encryption of the request message.

5.2 Response Message Data Flow and Processing

The data flow and processing of response messages from the server 106 to the client 104 is now described. The response messages from the server can also be viewed as part of a continuous stream of packets. The eTA system 102 preferably reassembles the stream into discrete responses for processing by the subsequent components in the response path, which is shown along the right-hand side of FIG. 8.

The eTA system 102 receives a stream of response messages at an input 830, which is shown at the upper right corner of FIG. 8. Depending on whether the response message stream is encrypted or not, the eTA system 102 routes the stream to either a Server Side Secure Input component or a Server Side Insecure Input component. In the case of an encrypted stream, the eTA system 102 routes the stream to a SSL Processing component for decryption. The response stream is then forwarded to a Server Response Manager, which segments the unencrypted response stream into discrete response messages. The Server Response Manager preferably ensures that all parts of the response, including cookies, are passed as a single entity to subsequent components of the eTA system 102.

The response message is then passed to the Fault Detection module 206 of the Session/Transaction Manager 810. The Fault Detection module 206 attempts to identify the response with one of the open transactions that the Session/Transaction Manager maintains in the data repository 812 using the transaction ID. If the Fault Detection module 206 does not identify the response with any known open transaction, then the response message is passed straight through to a Client Response Manager for relay to the client.

However, if the Fault Detection module 206 identifies the response message with an open transaction, the Fault Detection module 206 uses the corresponding configuration information to attempt to check the status response message. It can look at the HTTP response codes or, if appropriate, the HTML content to check the response. If the response is valid, the eTA system 102 passes the response message to the Client Response Manager for relay to the client 104. If the Fault Detection module 206 detects a failure, the eTA system 102 invokes the Outcome Determination component and provides it with the open transaction/session information, as well as the failed response. The processing of failures is discussed below in section 5.3.

The Client Response Manager then passes the response message either directly to a Client Side Secure Output component or to a Client Side Secure Output Component (via the SSL Processing component). If secure communication of the response message to the client 104 is required, then the SSL Processing component is used to perform an encryption of the response message.

5.3 Failure Processing

If a failure is detected by the Fault Detection module 206, the eTA system invokes the Outcome Determination component 212, which attempts to determine how much of the transaction relating to the response message was actually processed before the failure occurred. The Outcome Determination component 212 sends one or more outcome determination requests to the server associated with the failed transaction. The eTA system 102 may use existing API calls to the server to determine the state of the transaction. For example, if the failed request is "add item to shopping cart", the eTA system 102, via the Outcome Determination component, may send a "display contents of shopping cart" request message to the server to verify whether the "add item" request was successful. If the Outcome Determination component does not receive a response from the server after a specified time period, then the server is deemed to have failed. The eTA system 102 then invokes the Transaction Recovery component, as described further below.

5.3.1 Transaction Recovery

The Transaction Recovery component of the eTA system 102 attempts to transparently recover from failures. The transaction recovery component is part of the Action Subsystem module 214 shown in FIG. 2. If the Transaction Recovery component determines that the failure was transient, it preferably attempts to resubmit the request to the same server and thereby recover from the failure. However, if it is determined that the server has failed completely, the Transaction Recovery component attempts to recreate the session state on a replacement server. This may be accomplished by the eTA system 102 replaying all significant requests associated with the session to the replacement server and then associating the session with the new server.

In the event of a new session being established, a new session ID may be associated with the new session. The eTA system preferably automatically translates the new session ID into the old session ID, and vice-versa, so that the new session ID is transparent to the client 104.

Once the failure has been recovered from, or the Transaction Recovery component has determined that no recovery is possible, the eTA system 102 invokes a Failure Masking component, which is part of the Action Subsystem module 214. This component may relay the response from the Transaction Recovery component directly to the client 104 via the Client Response Manager or it may have to submit a failure masking request to the server 106. The purpose of the failure masking request is to get the client 104 back to a suitable reference point regarding the transaction. An example of a failure masking request is to submit a request to the server to "display contents of shopping cart". The eTA system 102 then updates the client regarding the contents of the transaction.

6.0 Hardware and Software Platforms for the eTA System

Figure 9:
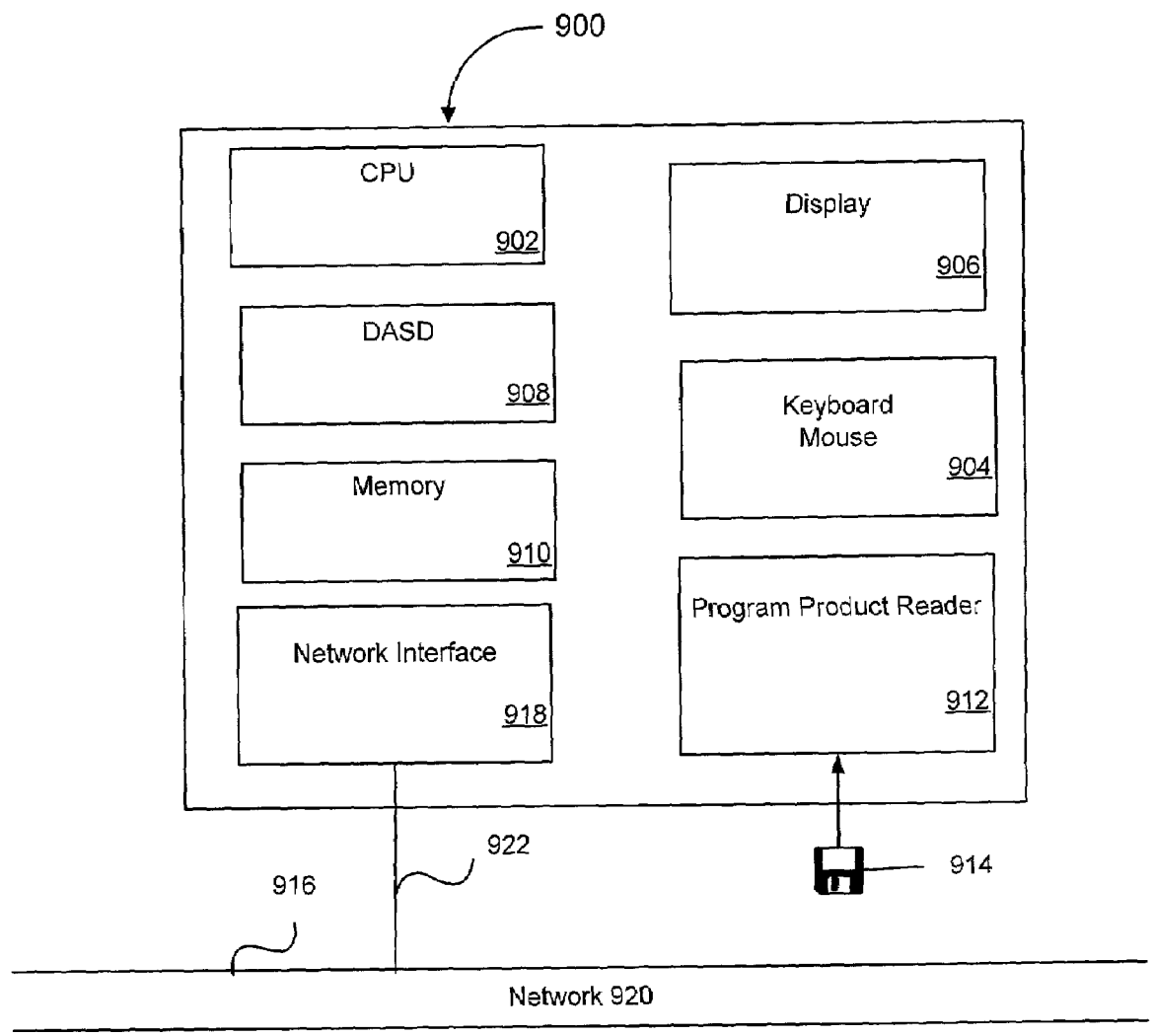
FIG. 9 is a block diagram of a computer in the computer network system of FIG. 1.

FIG. 9 is a block diagram of a computer in the network system of FIG. 1, illustrating the hardware components included in one of the computers, such as a computer that hosts the eTA system 102. Those skilled in the art will appreciate that the client 104, the server 106, and the computer that hosts the eTA system 102 may all have a similar computer construction, or may have alternative constructions consistent with the capabilities described herein.

FIG. 9 shows an exemplary computer 900 that operates under control of a central processor unit (CPU) 902. The type of computer can vary. In one embodiment, the computer 900 is a PC-compatible computer that has a Pentium II processor operating at a 450 MHz or higher level, has at least 128 Mbytes of RAM, and satisfies a minimum specification for a Gigabyte (GB) of data swap space and a minimum GB hard drive. In another embodiment, the computer 900 is a SPARC computer manufactured by Sun Microsystems that has an Ultra 5 processor operating at a 370 MHz or higher level, has at least 128 Mbytes of RAM, and satisfies a minimum specification for a Gigabyte (GB) of data swap space and a minimum GB hard drive. The eTA system preferably runs on at least the following software platforms: Solaris 2.7 or higher by Sun Microsystems, Windows NT 4.0 by Microsoft, Inc., or the Linux software platform.

With reference still to FIG. 9, a computer user can input commands and data from a keyboard and computer mouse 904, and can view inputs and computer output at a display 906. The display is typically a video monitor or flat panel display. The computer 900 also includes a direct access storage device (DASD) 908, such as a hard disk drive. The memory 910 typically comprises volatile semiconductor random access memory (RAM). Each computer preferably includes a program product reader 912 that accepts a program product storage device 914, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc.

Each computer 900 can communicate with the others over a computer network 920 (such as the Internet or an intranet) through a network interface 918 that enables communication over a connection 922 between the network 920 and the computer. The network interface 918 typically comprises, for example, a Network Interface Card (NIC) or a modem that permits communications over a variety of networks.

The CPU 902 operates under control of programming steps that are temporarily stored in the memory 910 of the computer 900. When the programming steps are executed, the computer performs its functions. Thus, the programming steps implement the functionality of the eTA system described above. The programming steps can be received from the DASD 908, through the program product storage device 914, or through the network connection 922. The program product storage drive 912 can receive a program product 914, read programming steps recorded thereon, and transfer the programming steps into the memory 910 for execution by the CPU 902. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 910 over the network 920. In the network method, the computer receives data including program steps into the memory 910 through the network interface 918 after network communication has been established over the network connection 922 by well-known methods that will be understood by those skilled in the art without further explanation. The program steps are then executed by the CPU 902 thereby comprising a computer process.

The present invention has been described above in terms of presently preferred embodiments so that an understanding of the present invention can be conveyed. There are, however, many configurations for network transaction processing techniques not specifically described herein, but with which the present invention is applicable. The present invention should therefore not be seen as limited to the particular embodiments described herein, but rather, it should be understood that the present invention has wide applicability with respect to network transaction processing techniques generally. All modifications, variations, or equivalent arrangements and implementations that are within the scope of the attached claims should therefore be considered within the scope of the invention.

We claim:

1. A method of processing electronic commerce transactions comprising messages exchanged between a client and a server of a computer network, the method comprising:
   establishing a communications connection between the network client and the network server at an electronic transaction assurance (eTA) system;
   receiving a request message from the client at the eTA system, the request message relating to an aspect of the electronic commerce transaction;
   extracting data from the request message to record a state of the electronic commerce transaction;
   detecting that a failure has occurred with respect to the electronic commerce transaction;
   determining whether an outcome of the electronic commerce transaction in relation to the request message has failed, and the actual state of the electronic commerce transaction at the failure;
   selecting an appropriate recovery action to recover from the failure based upon said actual state;
   transmitting a response message to the client in accordance with the recovery action, wherein the response message masks the failure from the client by providing an expected response to the request message from the client.

2. A method as defined in claim 1, additionally comprising identifying a transaction type associated with the electronic commerce transaction.

3. A method as defined in claim 1, wherein each transaction type has an associated transaction model, and additionally comprising maintaining a data base of transaction models and identifying a transaction type by selecting from a transaction model in the database.

4. A method as defined in claim 3, wherein a transaction model defines an expected response message from the server for a given request message from the client to thereby enable detecting that a failure has occurred with respect to the transaction when the expected response message is not received.

5. A method as defined in claim 3, wherein a transaction model defines suspicious activity such that fraudulent activity is deemed present when the suspicious activity is encountered in a transaction.

6. A method as defined in claim 1, wherein it is deemed that a failure has occurred with respect to the transaction when a response message is not received from the server in response to the request message.

7. A method as defined in claim 1, wherein a failure has occurred with respect to the transaction when an error code is contained within a response message from the server.

8. A method as defined in claim 1, additionally comprising discarding data that relates to a transaction state that is stored at the server.

9. A method as defined in claim 1, wherein determining whether an outcome of the transaction in relation to the request message has succeeded or failed comprises sending a query message to the server to inquire as to the state of the transaction.

10. A method as defined in claim 1, wherein the appropriate recovery action comprises re-directing the request message to another server in order to complete the failed transaction.

11. A method as defined in claim 1, wherein the commerce electronic transaction relates to adding an item to a shopping cart, and wherein extracting data from the request message to record a state of the electronic transaction comprises recording the contents of the shopping cart using data contained in the request message.

12. A method as defined in claim 1, wherein the response message masks the failure from the client such that the client is oblivious to the failure.

13. A method as defined in claim 1, wherein the response message masks the failure from the client such that the client is compensated for the failure.

14. A method of processing electronic commerce transactions comprising messages exchanged between a client and a server of a computer network, the method comprising:
   establishing a communications connection between the network client and the network server at an electronic transaction assurance (eTA) system and initiating a series of processes at the eTA system, the processes including:
   a transaction monitoring process wherein the eTA system monitors electronic commerce messages that are exchanged between the client and the server in relation to a transaction;
   a state capture process wherein the eTA system captures and records information descriptive of one or more states of the transaction;
   a failure detection process wherein the eTA system determines that a failure has occurred with respect to the transaction and the actual state of the transaction at failure;
   an outcome determination process wherein the eTA system determines the extent to which the server has processed the transaction;

a failure masking process wherein the eTA system masks the occurrence of the failure from the client by sending a response message to the client that is an expected response that the client would have received had the failure not occurred; and a transaction recovery process wherein the eTA system recovers the transaction from the failure based upon said actual state.

15. A method as defined in claim 14, wherein the state capture process comprises capturing packets contained in electronic request messages from the client to the server and storing the packets with an identifier associated with a particular transaction between the client and the server.

16. A method as defined in claim 14, wherein the failure detection process comprises monitoring for a failure code that is embedded in a response message from the server, wherein the failure code indicates that a failure has occurred.

17. A method as defined in claim 14, wherein the failure detection process comprises monitoring for a response message from the server and deeming that a failure has occurred if a response message is not received within a predetermined time span.

18. A method of processing network messages between a network client and a network server, the method comprising:

establishing a communications connection between the network client and the network server at an electronic transaction assurance (eTA) system;

receiving a network message at the eTA system, which is responsible for the communications between the network client and the network server;

identifying a transaction type and message parameters included in the received network message, thereby defining an electronic commerce transaction to which the message relates;

preserving a state of the electronic commerce transaction and updating the transaction type and message parameters in response to processing of the electronic commerce transaction;

indicating a detected failure in a network back-end system or the network communications connection in response to inspection of the content of a received response from back-end system servers or the lack of a received response within a predetermined time period;

determining the correct outcome of the electronic commerce transaction as affected by the detected failure and the state of the electronic commerce transaction at the failure, and selecting an appropriate action based upon said state to recover from the detected failure;

providing a response message to the network client corresponding to the correct outcome to mask the detected failure; and logging and reporting relevant information about the state and the message parameters of the electronic commerce transaction.

19. A method as defined in claim 18, wherein the communications connection is a secure connection.

20. A method as defined in claim 18, wherein indicating a detected failure comprises monitoring operation of hardware and software components of the communication connection.

21. A method as defined in claim 20, wherein monitoring comprises intercepting responses from the back-end servers and inspecting the enclosed messages to check for failures and formulating an appropriate response and sending it to the network client.

22. A method as defined in claim 18, wherein the network messages are transmitted in accordance with Internet protocol processing.

23. A method as defined in claim 18, further including training the transaction assurance system to classify and identify transaction types using a supervised machine learning technique, thereby enabling the system to be deployed in different e-business environments with different transaction models.

24. A method as defined in claim 23, wherein a transaction model is associated with a type of electronic commerce transaction such that the transaction model defines expected network activity with respect to the associated type of electronic commerce transaction.

25. A method as defined in claim 24, wherein the expected network activity comprises response messages that are expected from the server in response to request messages from the client.

26. A method as defined in claim 24, additionally comprising detecting a failure in a network backend system by comparing a response message from the backend system to an expected response message defined in a transaction model.

27. A method as defined in claim 24, wherein determining the correct outcome of the transaction is accomplished by determining an expected outcome that is defined in a transaction model.

28. A method as defined in claim 24, providing a response message to the network client with an appropriate message corresponding to the expected outcome to mask the detected failure is accomplished by using a response message that is defined in a transaction model.

29. A method as defined in claim 24, wherein a transaction model defines suspicious activity and additionally comprising determining that fraudulent activity is present when the suspicious activity is encountered in a transaction.

30. A method as defined in claim 24, wherein a transaction model defines a billing charge for a type of transaction and additionally comprising tabulating billing charges based on the number of times that an actual transaction defined in a transaction model is encountered.

31. A method as defined in claim 18, wherein the system permits resumption of communication with wireless clients when the wireless clients reconnect to the system, without having to resubmit requests they made before disconnecting from the system due to losing wireless signal.

32. A method for determining the outcome of an electronic commerce transaction initiated by a network message between a network client and a network server, the method comprising:

establishing a communications connection between the network client and the network server at an electronic transaction assurance (eTA) system;

receiving a network message related to said electronic commerce transaction at the eTA system, which is responsible for the communications between the network client and the network server;

identifying a transaction type and message parameters included in the received network message, thereby defining an electronic commerce transaction to which the message relates;

generating a transaction identifier associated with the received message and storing the transaction identifier information with the transaction type and message parameters at a back end database;

preserving a state of the electronic commerce transaction and updating the transaction type and message parameters in response to processing of the electronic commerce transaction);

resuming the electronic transaction from a failure based upon the preserved state at the failure; and masking the failure by providing an expected response to the received message.

33. A method as defined in claim 32, wherein the transaction identifier is stored in an existing field of the back end database.

34. A method as defined in claim 32, wherein the transaction identifier is stored in a database table of the back end database.

35. A method as defined in claim 32, wherein storing the transaction identifier comprises inserting information into the back end server database using an applet executing at the network client.

36. A method as defined in claim 32, wherein storing the transaction identifier comprises inserting information into the back end server database using an Internet cookie.

37. A method as defined in claim 32, wherein storing the transaction identifier comprises inserting information into the back end server database using a browser program at the network client.

38. A method for measuring the end-to-end response time of each electronic transaction message sent from a network client side to a network server side of a Web site, the method comprising:
  establishing a communications connection between the network client and the Web site network server through an electronic transaction assurance system (eTA);
  receiving a network message from the network client, comprising a request for a Web site page such that the request identifies a transaction type and message parameters, thereby defining an electronic commerce transaction to which the message relates;
  adding code to the Web page served to the network client that records the time when a request message is sent by the network client, indicating the start of an electronic commerce transaction, and when a response message is received by the network client, indicating the end of said electronic commerce transaction;
  generating a transaction identifier associated with each electronic commerce transaction request message received from the network client and storing the transaction identifier information with the transaction type and message parameters at a back end database;
  preserving a state of the electronic transaction and updating the transaction type and message parameters in response to processing of the electronic transaction;
  resuming the electronic transaction from a failure based upon the preserved state at the failure; and
  masking the failure by providing an expected response to the request message from the network client.

39. A method as defined in claim 38, wherein the transaction identifier is stored in a database table of the back end database.

40. A method as defined in claim 38, wherein storing the transaction identifier comprises inserting information into the back end server database using an applet executing at the network client.

41. A method as defined in claim 38, wherein storing the transaction identifier comprises inserting information into the back end server database using an Internet cookie.

42. A method as defined in claim 38, wherein storing the transaction identifier comprises inserting information into the back end server database using a browser program at the network client.

43. A method as defined in claim 38, wherein the eTA system includes multiple eTA nodes.

44. A method as defined in claim 43, wherein a received network message is directed to one of the available eTA nodes.

45. A method as defined in claim 38, further including:
  communicating information relating to the communications connection at the selected node to one or more of the remaining eTA nodes;
  detecting the removal or failure of the selected eTA node from operation during processing of the received network message;
  preserving the state of the selected eTA node processing with respect to the received network message in one or more nodes of the eTA system; and
  moving the communications connection from the removed selected node to one of the remaining eTA nodes that are still operating in accordance with the preserved node state such that the network client and network server that were using the selected eTA node do not see any interruption in their communications.

46. A program product for use in a processor that executes program steps recorded in a computer-readable media to perform a method of processing network messages between a network client and a network server, the program product comprising:
  a recordable media;
  a program of computer-readable instructions executable by the processor to perform operations comprising:
    establishing a communications connection between the network client and the network server at an electronic transaction assurance (eTA) system;
    receiving a network message at the eTA system, which is responsible for the communications between the network client and the network server;
    identifying a transaction type and message parameters included in the received network message, thereby defining an electronic commerce transaction to which the message relates;
    preserving a state of the electronic commerce transaction and updating the transaction type and message parameters in response to processing of the electronic commerce transaction;
    indicating a detected failure in a network back-end system or the network communications connection in response to inspection of the content of a received response from back-end system servers or the lack of a received response within a predetermined time period;
    determining the correct outcome of the electronic commerce transaction as affected by the detected failure and the state of the electronic commerce transaction at the failure, and selecting an appropriate action based upon said state and selecting an appropriate action to recover from the detected failure;
    providing an expected response message to the network client to mask the detected failure;
    logging and reporting relevant information about the state and the message parameters of the electronic commerce transaction.

47. A system that processes network messages between a network client and a network server, the system comprising one or more processors that execute program instructions and receive a data set, wherein the program instructions are executed to cause the processor to:
  establish a communications connection between the network client and the network server at an electronic transaction assurance (eTA) system;

receive a network message at the eTA system, which is responsible for the communications between the network client and the network server;

identify a transaction type and message parameters included in the received network message, thereby defining an electronic commerce transaction to which the message relates;

preserve a state of the electronic commerce transaction and update the transaction type and message parameters in response to processing of the electronic commerce transaction;

indicate a detected failure in a network back-end system or the network communications connection in response to inspection of the content of a received response from back-end system servers or the lack of a received response within a predetermined time period;

determine the correct outcome of the electronic commerce transaction as affected by the detected failure and the state of the electronic commerce transaction at the failure, and selecting an appropriate action based upon said state and selecting an appropriate action to recover from the detected failure;

provide an expected response message to the network client to mask the detected failure; and log and report relevant information about the state and the message parameters of the electronic commerce transaction.

48. A program product for use in a processor that executes program steps recorded in a computer-readable media to perform a method for determining the outcome of an electronic commerce transaction initiated by a network message between a network client and a network server, the program product comprising:

a recordable media;

a program of computer-readable instructions executable by the processor to perform operations comprising:

establishing a communications connection between the network client and the network server at an electronic transaction assurance (eTA) system;

receiving a message related to an electronic commerce transaction at the eTA system;

identifying a transaction type and message parameters included in the received message, thereby defining an electronic commerce transaction to which the message relates;

generating a transaction identifier associated with the received message and storing the transaction identifier information with the transaction type and message parameters at a back end database;

preserving a state of the electronic commerce transaction and updating the transaction type and message parameters in response to processing of the electronic commerce transaction; and masking a failure of the electronic commerce transaction by providing an expected response message to said received message based upon the preserved state at the failure.

49. A system that determines the outcome of an electronic commerce transaction initiated by a network message between a network client and a network server, the system comprising one or more processors that execute program instructions and receive a data set, wherein the program instructions are executed to cause the processor to:

establish a communications connection between the network client and the network server at an electronic transaction assurance (eTA) system;

receive a message related to an electronic commerce transaction at the eTA system;

identify a transaction type and message parameters included in the received message, thereby defining an electronic commerce transaction to which the message relates;

generate a transaction identifier associated with the received message and storing the transaction identifier information with the transaction type and message parameters at a back end database;

preserve a state of the electronic commerce transaction and updating the transaction type and message parameters in response to processing of the electronic commerce transaction; and masking a failure of the electronic commerce transaction by providing an expected response message to said received message based upon the preserved state at the failure.

50. A program product for use in a processor that executes program steps recorded in a computer-readable media to perform a method for measuring the end-to-end response time of each electronic commerce transaction message sent from a network client side to a network server side of a Web site, the program product comprising:

a recordable media;

a program of computer-readable instructions executable by the processor to perform operations comprising:

establishing a communications connection between the network client and the Web site network server;

receiving a network message from the network client, comprising a request for a Web site page such that the request identifies a transaction type and message parameters, thereby defining an electronic commerce transaction to which the message relates;

adding code to the Web page served to the network client that records the time when a request message is sent by the network client, indicating the start of an electronic commerce transaction, and when a response message is received by the client, indicating the end of said electronic commerce transaction;

generating a transaction identifier associated with each electronic commerce transaction request message received from the client and storing the transaction identifier information with the transaction type and message parameters at a back end database;

preserving a state of the electronic transaction and updating the transaction type and message parameters in response to processing of the electronic transaction;

resuming the electronic transaction from a failure based upon the preserved state at the failure; and masking the failure by providing an expected response to the request message from the network client.

51. A system that measures the end-to-end response time of each electronic commerce transaction message sent from a network client side to a network server side of a Web site, the system comprising one or more processors that execute program instructions and receive a data set, wherein the program instructions are executed to cause the processor to:

establish a communications connection between the network client and the Web site network server;

receive a network message from the network client, comprising a request for a Web site page such that the request identifies a transaction type and message parameters, thereby defining an electronic commerce transaction to which the message relates;

add code to the Web page served to the network client that records the time when a request message is sent by the network client, indicating the start of an electronic commerce transaction, and when a response is received by the client, indicating the end of said electronic commerce transaction;

generate a transaction identifier associated with each received from the client and store the transaction identifier information with the transaction type and message parameters at a back end database;

preserve a state of the electronic transaction and update the transaction type and message parameters in response to processing of the electronic transaction;

resume the electronic transaction from a failure based upon the preserved state at the failure; and masking the failure by providing an expected response to the request message from the network client.

* * * * *